US012748809B2

(12) United States Patent
Guo et al.

(10) Patent No.: US 12,748,809 B2
(45) Date of Patent: Sep. 29, 2026

(54) SYSTEMS AND METHODS FOR DOCUMENT GENERATION

(71) Applicant: ADOBE INC., San Jose, CA (US)

(72) Inventors: Shunan Guo, San Jose, CA (US); Yeuk-Yin Chan, Santa Clara, CA (US); Eunyee Koh, San Jose, CA (US); Caroline Jiwon Kim, San Francisco, CA (US); Cole Edward Connelly, San Jose, CA (US); Andrew Douglas Thomson, Moraga, CA (US)

(73) Assignee: ADOBE INC., San Jose, CA (US)

( * ) Notice: Subject to any disclaimer, the term of this patent is extended or adjusted under 35 U.S.C. 154(b) by 298 days.

(21) Appl. No.: 17/809,371

(22) Filed: Jun. 28, 2022

(65) Prior Publication Data

US 2023/0418881 A1 Dec. 28, 2023

(51) Int. Cl.

| | |
|---|---|
| ***G06F 16/93*** | (2019.01) |
| ***G06F 40/103*** | (2020.01) |
| ***G06F 40/14*** | (2020.01) |
| ***G06F 40/166*** | (2020.01) |

(52) U.S. Cl.
CPC ............ *G06F 16/93* (2019.01); *G06F 40/103* (2020.01); *G06F 40/14* (2020.01); *G06F 40/166* (2020.01)

(58) Field of Classification Search
CPC ...... G06F 16/93; G06F 40/103; G06F 40/166; G06F 40/14
USPC .......................................................... 715/234
See application file for complete search history.

(56) References Cited

U.S. PATENT DOCUMENTS

| | | | | |
|---|---|---|---|---|
| 10,936,961 B1 * | 3/2021 | Jain | G06N 3/006 |
| 11,157,680 B1 * | 10/2021 | Lee | G06F 40/197 |
| 2009/0115785 A1 * | 5/2009 | Grandhi | G06T 11/206 345/440 |
| 2010/0109860 A1 * | 5/2010 | Williamson | G08B 29/16 340/508 |
| 2014/0365510 A1 * | 12/2014 | Kawabuchi | G06F 16/24578 707/750 |
| 2020/0341779 A1 * | 10/2020 | Rohde | G06F 8/20 |
| 2021/0082128 A1 * | 3/2021 | Okada | G06T 7/248 |

OTHER PUBLICATIONS

Mailchimp, available at https://mailchimp.com/.
(Continued)

*Primary Examiner* — Stephen S Hong
*Assistant Examiner* — Tionna M Burke
(74) *Attorney, Agent, or Firm* — F. CHAU & ASSOCIATES, LLC

(57) ABSTRACT

Systems and methods for document generation are provided. One aspect of the systems and methods includes identifying, by a style extractor, a document fragment comprising a first style element of a first style category; computing, by a style generator, a reward function based on a correlation value between the first style element and a second style element of a second style category different from the first style category, wherein the correlation value is based on correlations between style elements in a plurality of historical document fragments; selecting, by the style generator, the second style element based on the reward function; and generating, by a document generator, a modified document fragment that includes the first style element of the first style category and the second style element of the second style category.

20 Claims, 17 Drawing Sheets

(56) References Cited

OTHER PUBLICATIONS

Activecampaign, available at https://www.activecampaign.com/.
Sendinblue, available at https://www.sendinblue.com/.
Moosend, available at https://moosend.com/.
Related to U.S. Appl. No. 17/383, 114 filed Jul. 22, 2021.
Related to U.S. Appl. No. 17/458,973, filed Aug. 27, 2021.

* cited by examiner

SYSTEMS AND METHODS FOR DOCUMENT GENERATION

BACKGROUND

The following relates generally to document generation. Document generation refers to the automated or semi-automated creation of documents. Document generation systems provide tools for increasing the efficiency of document generation tasks.

Some document generation systems provide a user with predetermined document options to select from. For example, conventional document generation techniques offer drag-and-drop user interfaces that allow a user to transfer design elements from a predetermined template to the contents of new document. However, conventional document generation techniques are labor-intensive and time-consuming because a user manually sets a design style of each component of the new document. There is therefore a need in the art for systems and methods that automatically generate a modified document fragment based on a style element included in an original document fragment.

SUMMARY

Embodiments of the present disclosure provide document generation systems and methods for generating a modified document fragment based on a style element of a style category included in an original document fragment. A style element refers to data that describes a visual characteristic of a content element, and a content element is a subdivision of a document fragment that includes content, such as text or an image. In at least one embodiment, a document generation system identifies a recommended fragment including another style element of another style category that is selected based on a reward function. In at least one embodiment, the reward function identifies a probability that the other style element is associated with the style element in a set of historical document fragments.

By generating a modified document that includes both the style element and the other style element that is likely to be historically associated with the style element included in the original document fragment, at least one embodiment of the present disclosure allows a user to quickly and easily generate a new, visually harmonious document fragment without resorting to a time-consuming and stylistically restrictive process of applying predetermined design templates to the content of the original document fragment.

A method, apparatus, non-transitory computer readable medium, and system for document generation are described. One or more aspects of the method, apparatus, non-transitory computer readable medium, and system include identifying a document fragment comprising a first style element of a first style category; computing a reward function based on a correlation value between the first style element and a second style element of a second style category different from the first style category, wherein the correlation value is based on correlations between style elements in a plurality of historical document fragments; selecting the second style element based on the reward function; and generating a modified document fragment that includes the first style element of the first style category and the second style element of the second style category.

A method, apparatus, non-transitory computer readable medium, and system for document generation are described. One or more aspects of the method, apparatus, non-transitory computer readable medium, and system include identifying a document fragment including a first style element to be preserved and a second style element to be modified, wherein the first style element corresponds to a first style category and the second style element corresponds to a second style category different from the first style category; selecting a modified second style element of the second style category based on a reward function that is computed based on a correlation value between the first style element and the modified second style element; and generating a modified document fragment that includes the first style element corresponding to the first style category and the modified second style element of the second style category.

An apparatus and system for document generation are described. One or more aspects of the apparatus and system include a style extractor configured to extract a first style element of a first style category from a document fragment; a style generator configured to compute a reward function based on a correlation value between the first style element of the first style category and a second style element of a second style category and to select the second style element based on the reward function, wherein the correlation value is based on correlations between style elements in a plurality of historical document fragments; and a style recommender configured to identify a recommended fragment that includes the first style element of the first style category and the second style element of the second style category.

DETAILED DESCRIPTION

Figure 1:
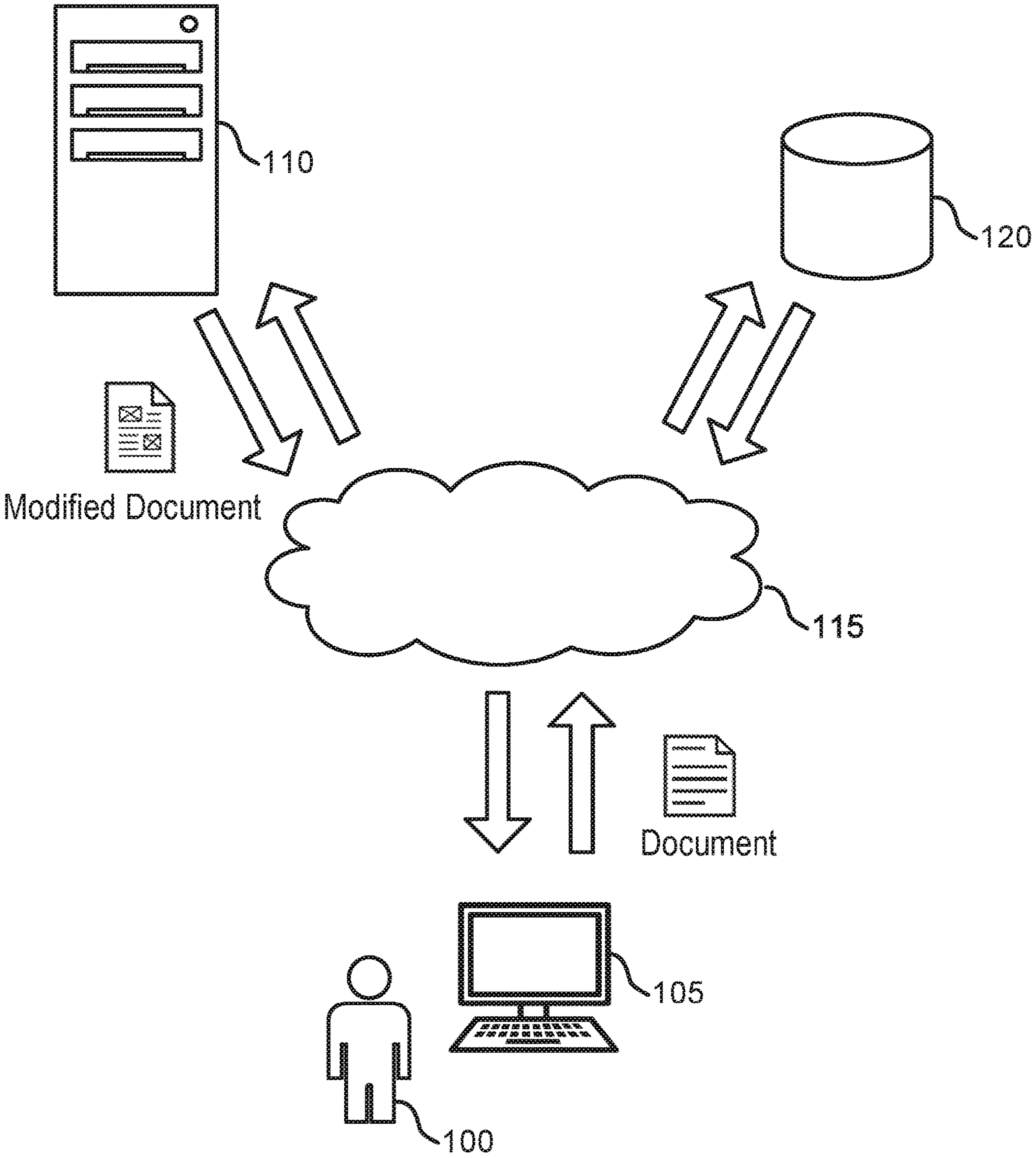
FIG. 1 shows an example of a document generation system according to aspects of the present disclosure.

The present disclosure relates generally to document generation. Document generation refers to an automated or semi-automated creation of documents.

Conventional document generation techniques provide a user with predetermined document options to select from. For example, conventional document generation techniques offer drag-and-drop user interfaces that allow a user to transfer design elements from a predetermined template to the contents of new document. However, conventional document generation techniques are labor-intensive and time-consuming because a user manually sets a design style of each component of the new document. Furthermore, the visual design of the new document is restricted to the design of the predetermined templates, which decreases a user's ability to apply desired visual characteristics in the new document.

The present disclosure describes a document generation system that includes a recommendation apparatus. In one aspect, the recommendation apparatus includes a style extractor, a style generator, and a document generator. In some embodiments, the style extractor identifies a document fragment comprising a first style element of a first style category. The style generator computes a reward function based on a correlation value between the first style element and a second style element of a second style category different from the first style category. The correlation value is based on correlations between style elements in a plurality of historical document fragments.

The style generator selects the second style element based on the reward function. The document generator generates a modified document fragment that includes the first style element of the first style category and the second style element of the second style category. By generating the modified document fragment based on a pair of associated style elements, at least one embodiment of the present disclosure saves a user the time and effort of manually reviewing and iteratively selecting predetermined design templates to apply to document content until the user finds a new document that is visually satisfactory.

By selecting the second style element based on a correlation value with the first style element, and generating a modified document that includes the first style element of the first style category and the second style element of the second style category, the document generator provides a modified document that includes a pair of style elements that are most likely to have been associated with each other in a set of historical document fragments, thereby helping to ensure that the modified document includes visually harmonious and appealing style elements. Furthermore, in some embodiments, the user provides the document generation system with the document fragment and the set of historical document fragments. By controlling the source of the first style element and the second style element, the user can effectively instruct the document generation system to pull pairs of style elements from a data set that the user knows to include visually desirable characteristics.

Additionally, at least one embodiment of the present disclosure provides the user with the ability to select whether style elements included in the document fragment are to be preserved or modified in the modified document fragment, thereby offering the user a greater degree of control over a generated document than conventional document generation techniques. Furthermore, at least one embodiment of the present disclosure provides a style recommender that incorporates an efficient element matching algorithm to support content retention before and after style changes so that the preset contents can be preserved while a user iterates on design styles of a document fragment.

As used herein, the term "document" refers to a media file that includes content such as text content, image content, video content, or links to content such as a hypertext link or a file path, or any combination thereof. Examples of a document include a word processing file, an XML file, a spreadsheet file, a presentation program file, a Portable Document Format (PDF) file, an HTML email, an HTML file of a webpage, and the like. Any of the above documents can include content such as text content, image content, video content, or links to content such as a hypertext link or a file path, or any combination thereof. In some embodiments, a document is structured according to a document object model (DOM) hierarchy. In some embodiments, the DOM hierarchy comprises an HTML DOM tree.

As used herein, the term "document fragment" refers to a subdivision of a document. In some embodiments, a document fragment is identified by one or more DOM elements included in the document. As used herein, the term "historical document fragment" refers to one of a set of document fragments that are stored in a database.

As used herein, the term "content element" refers to a subdivision of a document fragment. In some embodiments, a content element includes content, such as an image, text, or a button, or includes a file path to a location of the content. In some embodiments, a content element is identified by one or more DOM elements included in the document.

As used herein, the term "style element" refers to data that describes a visual characteristic of a corresponding content element. As used herein, "style categories" are types of style elements. In some embodiments, the style categories include a layout style category including layout style elements, a color scheme style category including color scheme style elements, a button style category including button style elements, a text style category including text style elements, and an image style category including image style elements. In some embodiments, the document generation system stores style elements extracted from document fragments according to their corresponding style categories.

As used herein, the term "correlation value" is a co-occurrence probability that a given style element of a set of style elements is included in a document fragment among a set of document fragments with another given style element.

As used herein, the term "reward function" is an algorithm that calculates a search reward based on average correlation values among a set of style element clusters. In at least one embodiment, the style generator computes a set of correlation values based on probabilities that pairs of style element clusters are included together in historical document fragments of a set of historical document fragments. The style generator generates a correlation graph based on the set of style element clusters, such that a style element cluster is represented as a node in the correlation graph and a correlation value is represented as an edge connecting a pair of nodes.

The style generator searches through a set of target candidate paths in the correlation graph using a Monte Carlo tree search algorithm to identify one or more style elements to be included in a recommended fragment. Using the Monte Carlo tree search algorithm, a search tree is iteratively expanded based on the search reward computed according to the reward function, such that a top number of candidate paths corresponding to a predetermined search reward are preserved as candidate paths as the search tree expands.

At least one embodiment of the inventive concept is used in an email campaign context. In this case, the document is an HTML email, and the user may be attempting to refine the design of the email to match with other documents and media included in the campaign. Creating a visually appealing and effective email may include arranging content elements according to particular style elements, such as font, shape, color, etc. A user may therefore want to begin with an email that is partially designed, and modify the email based on recommendations from a professional design program. However, users of conventional design programs may need to go back and forth in a time-consuming process to adjust design decisions and make sure that style elements are consistent throughout the email, or may be limited to a finite number of design templates that may be difficult to customize and might not accommodate content the user wishes to include in the email. Accordingly, an embodiment of the present disclosure provides a document generation system and method that generates a modified email fragment for the user based on a style element included in the user-provided email fragment, such that the user can quickly and easily review a set of modified email fragments that are generated to include style elements that have a high probability of association with the style element included in the user-provided email fragment, and thus are likely to be visually appealing.

Figure 3:
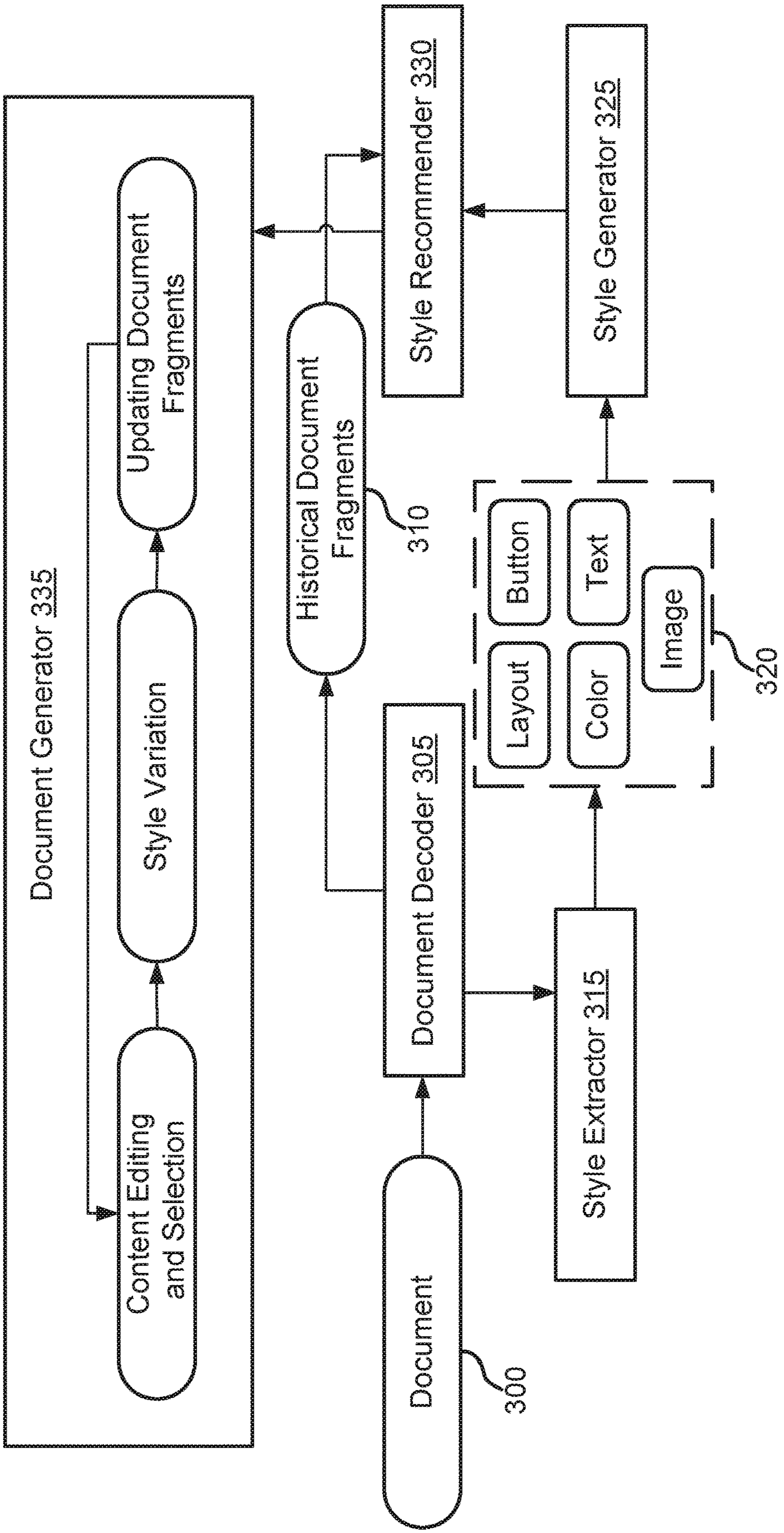
FIG. 3 shows an example of data flow in a recommendation apparatus according to aspects of the present disclosure.
Figure 4:
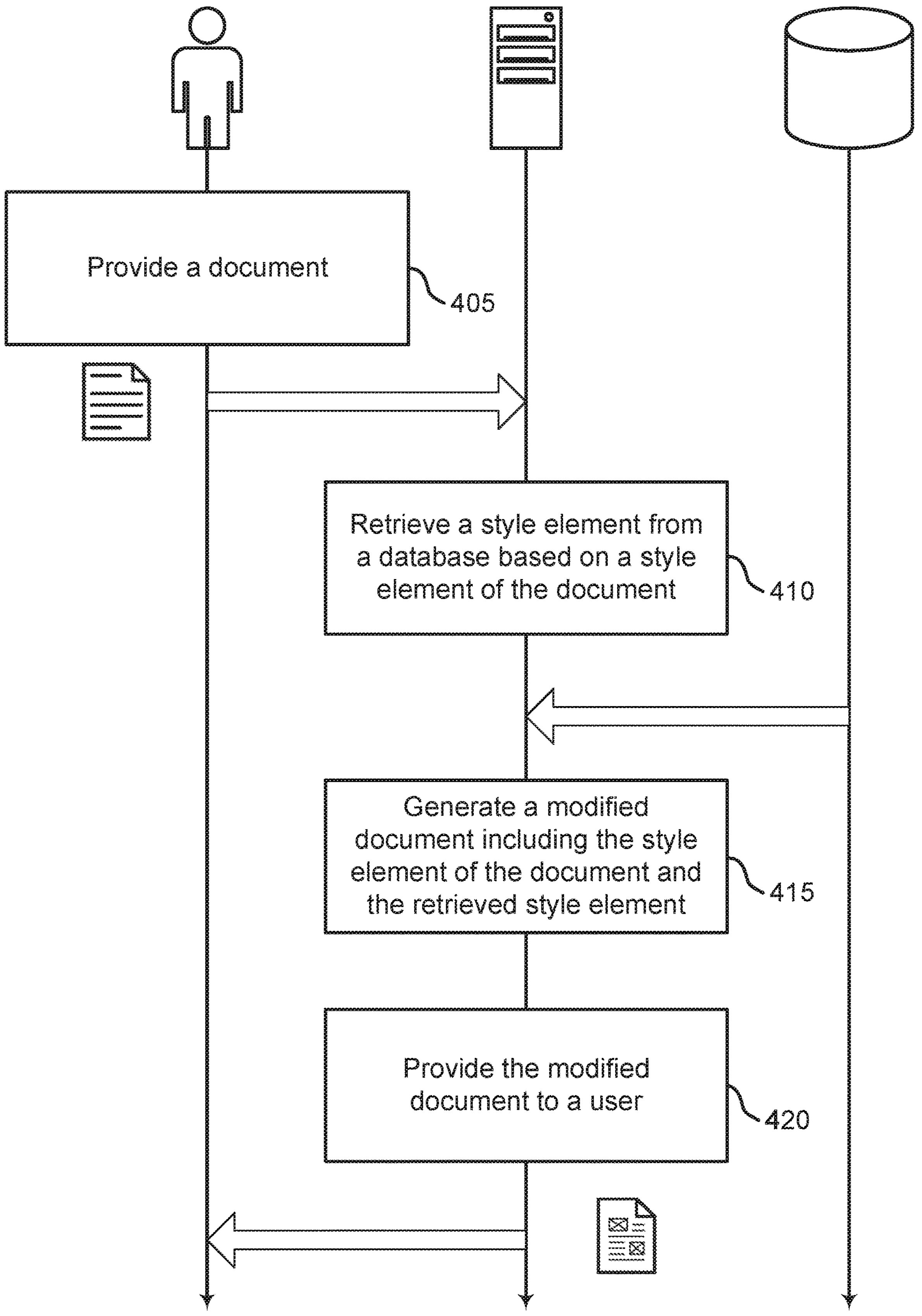
FIG. 4 shows an example of document generation according to aspects of the present disclosure.

An example application of the present disclosure in the email campaign context is provided with reference to FIGS. 1 and 4. Details regarding the architecture of a document generation system are provided with reference to FIGS. 1-3. Examples of a process for document generation are provided with reference to FIGS. 4-14. Examples of a process for generating a modified document fragment based on style element preservation are provided with reference to FIGS. 15-17.

Document Generation System

A system and apparatus for document generation is described with reference to FIGS. 1-3. One or more aspects of the system and apparatus include a style extractor configured to extract a first style element of a first style category from a document fragment; a style generator configured to compute a reward function based on a correlation value between the first style element of the first style category and a second style element of a second style category and to select the second style element of the second style category based on the reward function, wherein the correlation value is based on correlations between style elements in a plurality of historical document fragments; and a style recommender configured to identify a recommended fragment that includes the first style element of the first style category and the second style element of the second style category.

Some examples of the system and apparatus further include a document generator configured to generate a modified document fragment that includes the first style element of the first style category and the second style element of the second style category. Some examples of the system and apparatus further include a document decoder configured to extract the document fragment from a structured document.

FIG. 1 shows an example of a document generation system according to aspects of the present disclosure. The example shown includes user 100, user device 105, recommendation apparatus 110, cloud 115, and database 120.

Referring to FIG. 1, a user provides a document to the document generation system, and the document generation system generates a modified document by recommending a change to a style element included in the document based on another style element included in the document. In some embodiments, the document is an HTML document, such as an HTML-based email.

According to some aspects, user device 105 is a personal computer, laptop computer, mainframe computer, palmtop computer, personal assistant, mobile device, or any other suitable processing apparatus. In some examples, user device 105 includes software that displays a graphical user interface provided by recommendation apparatus 110. In some cases, the graphical user interface is a document generation user interface described with reference to FIGS. 5, 14, and 17.

In some aspects, the graphical user interface provides interactive visual elements that allow user 100 to provide instructions to recommendation apparatus 110, including selecting a document fragment to be used as a basis for a modified document fragment, selecting style elements of the document fragment to be modified or preserved, selecting a modified document fragment to be included in a modified document, and other actions as described with reference to FIGS. 4-17. According to some aspects, user device 105 includes a document generator described with reference to FIGS. 2 and 3. In these cases, the document generator is implemented as a software application, and recommendation apparatus 110 is implemented as an application server for the document generator.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

According to some aspects, recommendation apparatus 110 recommends new document fragments and/or style elements to a user based on an original document fragment. In at least one embodiment, recommendation apparatus 110 identifies a recommended fragment including a second style element by matching a first style element included in a document fragment with the second style element based on a reward function. In at least one embodiment, the reward function indicates a likelihood that the first style element and the second style element are included together in other document fragments, thereby implying a likelihood that the pair of style elements are visually harmonious and appealing.

According to some aspects, recommendation apparatus 110 includes a computer implemented network. In some embodiments, recommendation apparatus 110 also includes one or more processors, a memory subsystem, a communication interface, an I/O interface, one or more user interface components, and a bus. Additionally, in some embodiments, recommendation apparatus 110 communicates with user device 105 and database 120 via cloud 115.

In some cases, recommendation apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used.

In some cases, the server is configured to send and receive hypertext markup language (HTML) formatted files (e.g., for displaying web pages). In some cases, the server is configured to receive a JSON request from the user interface to a style recommender component and style generator component as described with reference to FIGS. 2 and 3. In some cases, the JSON request includes the document, a user-selected document fragment, and a user-requested number of candidate document fragments. In various embodiments, the server comprises a general purpose computing device, a personal computer, a laptop computer, a mainframe computer, a supercomputer, or any other suitable processing apparatus.

Figure 2:
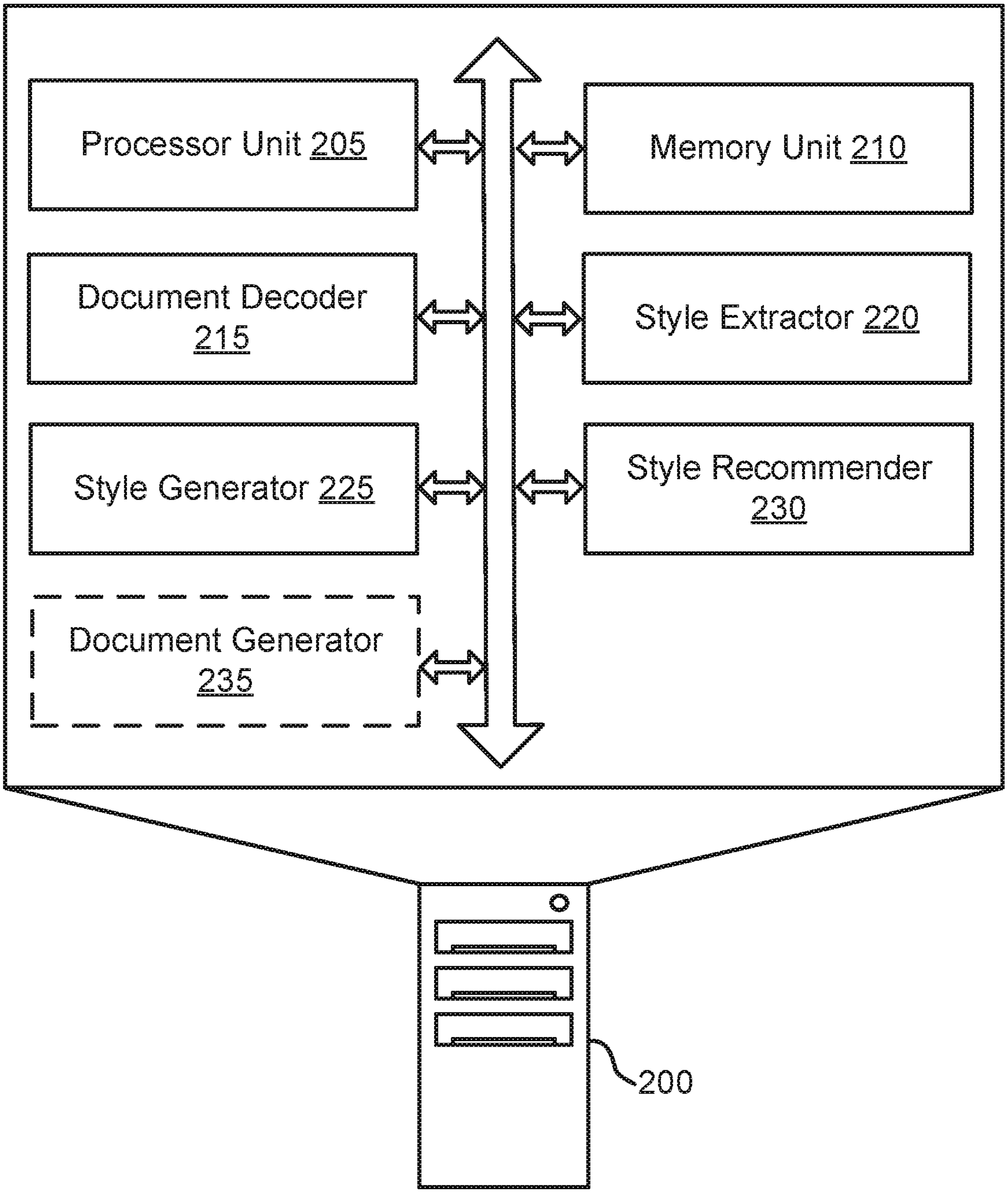
FIG. 2 shows an example of a recommendation apparatus according to aspects of the present disclosure.

Further detail regarding the architecture of recommendation apparatus 110 is provided with reference to FIGS. 2-3. Further detail regarding a process for document generation is provided with reference to FIGS. 4-14. Further detail regarding a process for document generation based on style element preservation is provided with reference to FIGS. 15-17. Recommendation apparatus 110 is an example of, or includes aspects of, the corresponding element described with reference to FIG. 2.

Cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, recommendation apparatus 110, and database 120.

Database 120 is an organized collection of data. In an example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, user 100 interacts with the database controller. In other cases, the database controller operates automatically without user interaction. According to some aspects, database 120 stores the various outputs generated by components of recommendation apparatus 110, documents, document fragments, historical document fragments, recommended fragments, style elements, content elements, correlation graphs, Monte Carlo tree search sequences, correlation values, rewards computed according to reward functions, modified document fragments, candidate document fragments, modified documents, and other outputs described with reference to FIGS. 4-17. In some embodiments, database 120 is external to recommendation apparatus 110 and communicates with recommendation apparatus 110 via a network such as cloud 115. In some embodiments, database 120 is included in recommendation apparatus 110.

FIG. 2 shows an example of a recommendation apparatus according to aspects of the present disclosure. Recommendation apparatus 200 is an example of, or includes aspects of, the corresponding element described with reference to FIG. 1. In one aspect, recommendation apparatus 200 includes processor unit 205, memory unit 210, document decoder 215, style extractor 220, style generator 225, style recommender 230, and document generator 235.

Processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, document decoder 215 receives a document structured according to a document object model (DOM) hierarchy. In some examples, document decoder 215 identifies a set of DOM elements of the DOM hierarchy, where the document fragment corresponds to one of the set of DOM elements. In some aspects, the DOM hierarchy includes an HTML DOM tree.

According to some aspects, document decoder 215 is configured to extract the document fragment from a structured document. According to some aspects, document decoder 215 is configured to extract one or more content elements from the structured document. Document decoder 215 is an example of, or includes aspects of, the corresponding element described with reference to FIG. 3. Document decoder 215 is implemented as one or more hardware circuits, as firmware, as software, or as a combination thereof.

According to some aspects, style extractor 220 identifies a document fragment including a first style element of a first style category. According to some aspects, style extractor 220 identifies a document fragment including a first style element to be preserved and a second style element to be modified, wherein the first style element corresponds to a first style category and the second style element corresponds to a second style category different from the first style category.

In some examples, style extractor 220 extracts the first style element from the document fragment based on a style tag. In some examples, style extractor 220 identifies a set of style categories including the first style category and the second style category. In some aspects, the set of style categories includes a layout style category, a color scheme category, a button style category, a text style category, an image style category, or any combination thereof.

In some examples, style extractor 220 receives a set of historical document fragments. In some examples, style extractor 220 extracts a set of style elements from each of the set of historical document fragments.

According to some aspects, style extractor 220 is configured to extract a first style element from a document fragment. Style extractor 220 is an example of, or includes aspects of, the corresponding element described with reference to FIG. 3. Style extractor 220 is implemented as one or more hardware circuits, as firmware, as software, or as a combination thereof.

According to some aspects, style generator 225 computes a reward function based on a correlation value between the first style element of the first style category and a second style element of a second style category, wherein the correlation value is based on correlations between style elements in a set of historical document fragments. In some examples, style generator 225 identifies a set of style categories including the first style category and the second style category. In some examples, style generator 225 selects the second style element based on the reward function.

In some examples, style generator 225 clusters the set of style elements to obtain a set of style element clusters. In some examples, style generator 225 computes a set of correlation values based on a co-occurrence of pairs of the set of style element clusters, where the correlation value between the first style element and the second style element includes one of the set of correlation values.

In some examples, style generator 225 generates a graph based on the set of style element clusters and the set of correlation values. In some examples, style generator 225 identifies a first style element cluster corresponding to the first style element from the set of style element clusters. In some examples, style generator 225 performs a Monte Carlo tree search (MCTS) beginning with the first style element cluster based on the graph. In some examples, style generator 225 selects a second style element cluster based on the MCTS, where the second style element cluster is selected based on the reward function, and where the second style element is selected based on the second style element cluster.

In some examples, style generator 225 selects a set of style elements based on the MCTS, where the modified document fragment includes the set of style elements. In some examples, style generator 225 identifies a target number of candidate paths. In some examples, style generator 225 selects a set of candidate paths through the graph based on the MCTS and the target number of candidate paths.

According to some aspects, style generator 225 selects a modified second style element of the second style category based on a reward function that is computed based on a correlation value between the first style element and the modified second style element.

According to some aspects, style generator 225 is configured to compute a reward function based on a correlation value between the first style element and a second style element and to select the second style element based on the reward function. Style generator 225 is an example of, or includes aspects of, the corresponding element described with reference to FIG. 3. Style generator 225 is implemented as one or more hardware circuits, as firmware, as software, or as a combination thereof.

According to some aspects, style recommender 230 generates a context feature vector representing the document fragment. In some examples, style recommender 230 compares the context feature vector to a set of historical context feature vectors representing a set of historical document fragments, respectively. In some examples, style recommender 230 selects a recommended historical document fragment of the set of historical document fragments based on the comparison. In some examples, style recommender 230 displays the recommended historical document fragment.

In some examples, style recommender 230 identifies a recommended fragment that includes the second style element. In some examples, style recommender 230 identifies a set of content elements in the document fragment. In some examples, style recommender 230 verifies that the recommended fragment includes a set of matching content elements corresponding to the set of content elements.

In some examples, style recommender 230 associates each of the set of content elements with matching content elements of the set of matching content elements. In some examples, style recommender 230 transfers content from each of the set of content elements to the matching content element, where the modified document fragment includes the transferred content. In some examples, style recommender 230 performs a bipartite graph matching process, where each of the set of content elements is associated with the matching content element based on the bipartite graph matching process. In some examples, style recommender 230 identifies an additional content element in the recommended fragment that does not correspond to the set of document elements in the document fragment. In some examples, style recommender 230 includes default content in the additional content element.

According to some aspects, style recommender 230 is configured to identify a recommended fragment that includes the second style element. Style recommender 230 is an example of, or includes aspects of, the corresponding element described with reference to FIG. 3. Style recommender 230 is implemented as one or more hardware circuits, as firmware, as software, or as a combination thereof.

According to some aspects, document generator 235 generates a modified document fragment that includes the first style element of the first style category and the second style element of the second style category. According to some aspects, document generator 235 generates a modified document fragment that includes the first style element corresponding to the first style category and the modified second style element of the second style category. In some examples, document generator 235 identifies a set of candidate document fragments including the modified document fragment. In some examples, document generator 235 receives a user selection identifying the modified document fragment. In some examples, document generator 235 replaces the document fragment with the modified document fragment based on the user selection.

According to some aspects, document generator 235 is configured to generate a modified document fragment that includes the second style element. Document generator 235 is an example of, or includes aspects of, the corresponding element described with reference to FIG. 3. In some embodiments, document generator 235 is implemented as one or more hardware circuits, as firmware, as software, or as a combination thereof. In some embodiments, document generator 235 displays a graphical user interface (GUI) (such as a document generation user interface described with reference to FIGS. 5, 14, and 17) for a user to interact with recommendation apparatus 200 via a user device. In some embodiments, the GUI is displayed via an application such as a web browser included in the user device. In some embodiments, document generator 235 is implemented as a software application, such that recommendation apparatus 200 is an application server for document generator 235, and document generator 235 is included in the user device.

FIG. 3 shows an example of data flow in a recommendation apparatus according to aspects of the present disclosure. The example shown includes document 300, document decoder 305, historical document fragments 310, style extractor 315, style elements 320, style generator 325, style recommender 330, and document generator 335.

Document decoder 305 is an example of, or includes aspects of, the corresponding element described with reference to FIG. 2. Style extractor 315 is an example of, or includes aspects of, the corresponding element described with reference to FIG. 2. Style generator 325 is an example of, or includes aspects of, the corresponding element described with reference to FIG. 2. Style recommender 330 is an example of, or includes aspects of, the corresponding element described with reference to FIG. 2. Document generator 335 is an example of, or includes aspects of, the corresponding element described with reference to FIG. 2.

Referring to FIG. 3, document decoder 305 receives document 300 and decomposes document 300 to obtain document fragments. Document decoder 305 stores the document fragments in a database along with document fragments obtained from other documents as historical document fragments. Document decoder 305 also provides the document fragments to style extractor 315. Style extractor 315 extracts style elements (including layout style elements, button style elements, color style elements, text style elements, image style elements, or a combination thereof) from the document fragments and stores them in a database along with other style elements extracted from other document fragments.

Style generator 325 retrieves the style elements from the database and selects a second style element from the style elements based on a reward function that corresponds to a co-occurrence probability between the second style element and a first style element included in a document fragment of document 300. Style generator 325 passes the second style element to style recommender 330. In some cases, style recommender 330 identifies a recommended fragment that includes the second style element. In some cases, style recommender 330 compares historical document fragments 310 to find candidate document fragments that are similar to a user selected design fragment. Style recommender 330 provides the recommended fragment to document generator 335, and document generator 335 generates a modified document fragment by updating the document fragment to include the second style element. Document generator 335 also allows the user to provide input via graphical user interface for further content editing and selection and style variation.

Document Generation

A method for document generation is described with reference to FIGS. 4-14. One or more aspects of the method include identifying a document fragment comprising a first style element of a first style category; computing a reward function based on a correlation value between the first style element of the first style category and a second style element of a second style category different from the first style category, wherein the correlation value is based on correlations between style elements in a plurality of historical document fragments; selecting the second style element based on the reward function; and generating a modified document fragment that includes the first style element of the first style category and the second style element of the second style category.

Some examples of the method further include receiving a document structured according to a document object model (DOM) hierarchy. Some examples further include identifying a plurality of DOM elements of the DOM hierarchy, wherein the document fragment corresponds to one of the plurality of DOM elements. In some aspects, the DOM hierarchy comprises an HTML DOM tree.

Some examples of the method further include extracting the first style element from the document fragment based on a style tag. Some examples of the method further include identifying a plurality of style categories including the first style category and the second style category. In some aspects, the plurality of style categories includes a layout style category, a color scheme category, a button style category, a text style category, an image style category, or any combination thereof.

Some examples of the method further include receiving a plurality of historical document fragments. Some examples further include extracting a plurality of style elements from each of the plurality of historical document fragments. Some examples further include clustering the plurality of style elements to obtain a plurality of style element clusters. Some examples further include computing a plurality of correlation values based on a co-occurrence of pairs of the plurality of style element clusters, wherein the correlation value between the first style element and the second style element comprises one of the plurality of correlation values.

Some examples of the method further include generating a graph based on the plurality of style element clusters and the plurality of correlation values. Some examples further include identifying a first style element cluster corresponding to the first style element from the plurality of style element clusters. Some examples further include performing a Monte Carlo tree search (MCTS) beginning with the first style element cluster based on the graph. Some examples further include selecting a second style element cluster based on the MCTS, wherein the second style element cluster is selected based on the reward function, and wherein the second style element is selected based on the second style element cluster.

Some examples of the method further include selecting a plurality of style elements based on the MCTS, wherein the modified document fragment comprises the plurality of style elements. Some examples of the method further include identifying a target number of candidate paths. Some examples further include selecting a plurality of candidate paths through the graph based on the MCTS and the target number of candidate paths.

Some examples of the method further include generating a context feature vector representing the document fragment. Some examples further include comparing the context feature vector to a plurality of historical context feature vectors representing a plurality of historical document fragments, respectively. Some examples further include selecting a recommended historical document fragment of the plurality of historical document fragments based on the comparison. Some examples further include displaying the recommended historical document fragment.

Some examples of the method further include identifying a recommended fragment that includes the second style element. Some examples further include identifying a plurality of content elements in the document fragment. Some examples further include verifying that the recommended fragment comprises a plurality of matching content elements corresponding to the plurality of content elements.

Some examples of the method further include associating each of the plurality of content elements with a matching content element of the plurality of matching content elements. Some examples further include transferring content from each of the plurality of content elements to the matching content element, wherein the modified document fragment comprises the transferred content.

Some examples of the method further include performing a bipartite graph matching process, wherein each of the plurality of content elements is associated with the matching content element based on the bipartite graph matching process. Some examples of the method further include identifying an additional content element in the recommended fragment that does not correspond to the plurality of content elements in the document fragment. Some examples further include including default content in the additional content element.

FIG. 4 shows an example of document generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, a user provides the system with a document to be modified. In some cases, the user selects, via a graphical user interface, a fragment of the document to be modified. In some cases, the user selects, via the graphical user interface, a content element of the document to be modified. The system analyzes the document based on the user selection to determine style elements included in the document, retrieves a style element from a database based on a style element included in the document, generates a modified document including the retrieved style element, and provides the modified document to the user. The system thereby provides the user with a modified document that is modified at a style element level of detail, giving the user a finer level of control over the visual appearance of the modified document than is provided by conventional document generation techniques.

At operation 405, the user described with reference to FIG. 1 provides a document to the system. In some cases, the user uploads the document to the system via a prompt in a graphical user interface displayed by the system via a user device. In some cases, the document is an HTML document, such as an HTML email.

At operation 410, the system retrieves a style element from a database based on a style element of the document. In some cases, the operations of this step refer to, or may be performed by, a recommendation apparatus as described with reference to FIGS. 1 and 2. In some embodiments, the recommendation apparatus computes a reward function based on a correlation value between the style element of the document and the style element in the database, and selects the style element from the database based on the reward function, as described with reference to FIGS. 6, 8, and 9.

At operation 415, the system generates a modified document including the style element of the document and the retrieved style element. In some cases, the operations of this step refer to, or may be performed by, a recommendation apparatus as described with reference to FIGS. 1 and 2. In some embodiments, the recommendation apparatus generates a modified document fragment that includes the retrieved style element as described with reference to FIGS. 6 and 11, and generates a modified document by replacing the document fragment with the modified document fragment as described with reference to FIG. 16

At operation 420, the system provides the modified document to a user. In some cases, the operations of this step refer to, or may be performed by, a recommendation apparatus as described with reference to FIGS. 1 and 2. In some embodiments, the recommendation apparatus displays the modified document to a user, and offers an option for the user to save the modified document as a local copy on the user device, in cloud storage (such as cloud storage included in a cloud described with reference to FIG. 1), or in a database (such as the database described with reference to FIG. 1).

Figure 5:
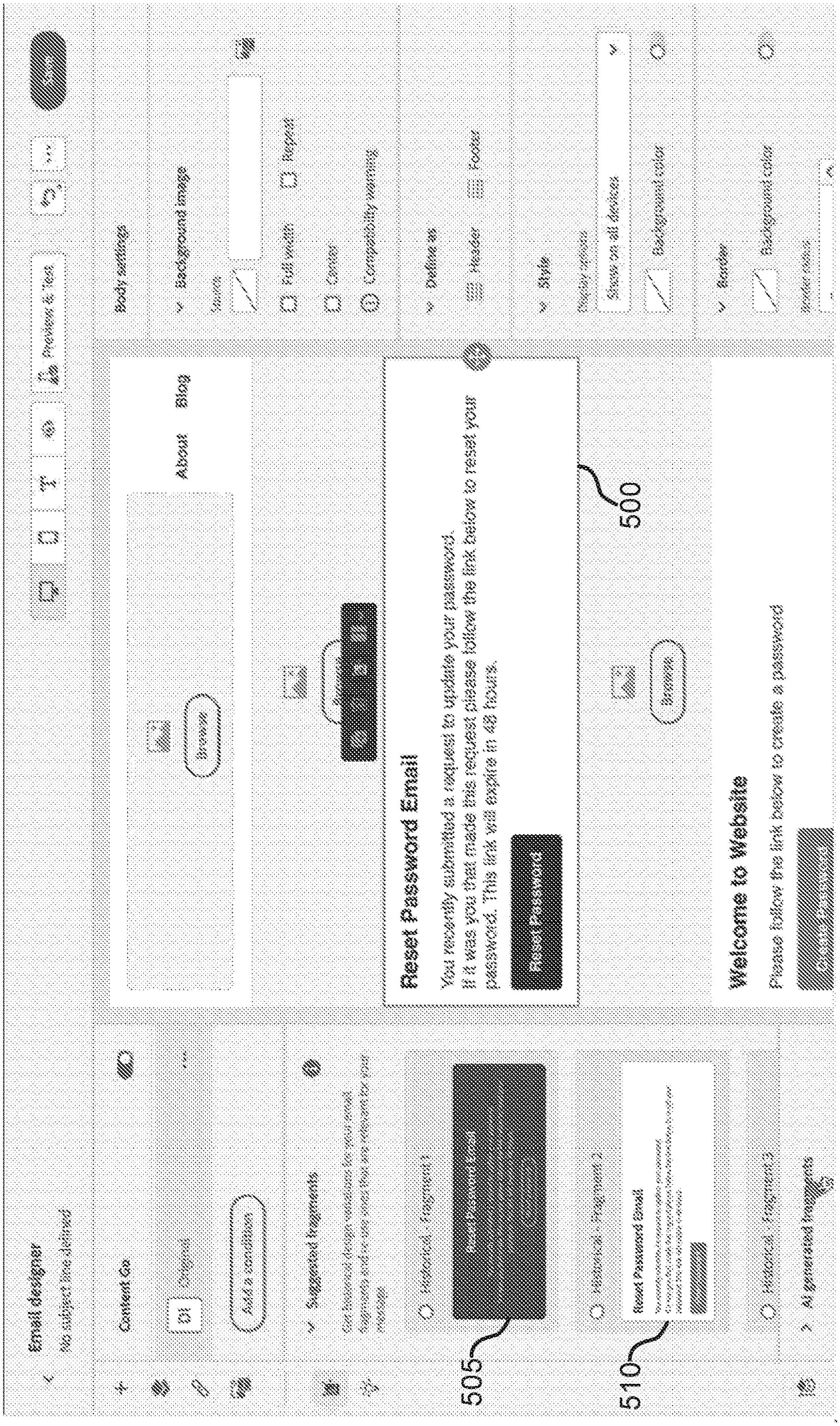
FIG. 5 shows an example of a document generation user interface according to aspects of the present disclosure.

FIG. 5 shows an example of a document generation user interface according to aspects of the present disclosure. The example shown includes document fragment 500, first recommended historical document fragment 505, and second recommended historical document fragment 510. Document fragment 500 is an example of, or includes aspects of, the corresponding element described with reference to FIGS. 7 and 16.

Referring to FIG. 5, the recommendation apparatus displays the document generation user interface via a user device. In some embodiments, a document generation described with reference to FIGS. 2 and 3 displays the document generation user interface. In some examples, the document generator is a software application provided on the user device, and the document generator includes the document generation user interface. The document generation user interface displays a document including document fragment 500. Document fragment 500 includes content elements corresponding to style elements, such as a layout content element corresponding to one or more layout style elements, one or more color content elements corresponding to one or more color style elements, a text content element corresponding to one or more text style elements, and a button content element corresponding to one or more button style elements. The style elements provide visual characteristics of content included in the content elements.

Referring to FIG. 5, the document generation user interface also displays first recommended historical document fragment 505 and second recommended historical document fragment 510. In some embodiments, first recommended historical document fragment 505 and second recommended historical document fragment 510 are generated as described with reference to FIG. 11. In some embodiments, first recommended historical document fragment 505 and second recommended historical document fragment 510 are generated as described with reference to FIG. 12. As shown in FIG. 5, first recommended historical document fragment 505 and second historical document fragment 510 each include content included in document fragment 500, but include different style elements from each other and from document fragment 500.

Referring to FIG. 5, a user has selected an option to view recommended historical document fragments. However, the document generation user interface also provides an option to view recommended fragments that are generated based on a style element that is selected based on a reward function, as described with reference to FIGS. 6-10. The document generation user interface also provides a side tool bar for manually editing style elements of the document fragment.

Figure 6:
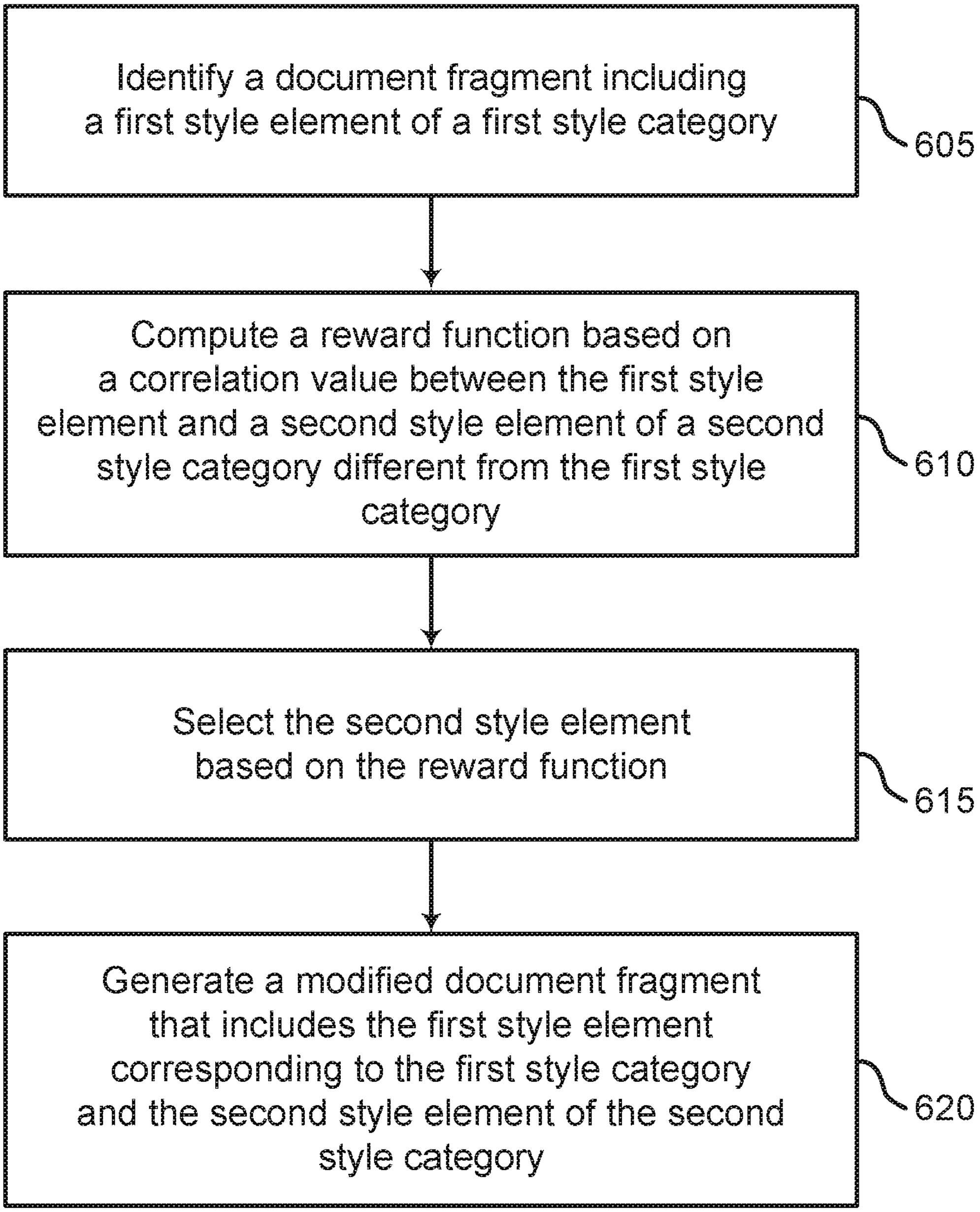
FIG. 6 shows an example of generating a modified document fragment according to aspects of the present disclosure.

FIG. 6 shows an example of generating a modified document fragment according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the system generates a modified document fragment based on a style element included in an original document fragment and a second style element determined based on a correlation between the second style element and the first style element. As used herein, a document fragment is a portion of a document. In some cases, a document fragment is identified according to labeling information included in the document. As used herein, a content element is a portion of a document fragment, where the content element is identified according to labeling information included in the document. In some cases, a style element corresponds to a visual characteristic of the content element. By generating the modified document based on a pair of style elements, the system provides the user with a modified document fragment that is customized according to a style-element granularity level. Conventional document generation techniques use predetermined design templates in a drag-and-drop user interface context, which restrict the user customization of the document to a relatively higher level.

At operation 605, the system identifies a document fragment including a first style element of a first style category. In some cases, the operations of this step refer to, or may be performed by, a style extractor as described with reference to FIGS. 2 and 3. For example, in some embodiments, a document decoder described with reference to FIGS. 2 and 3 receives a document from a user via a file upload process or other delivery process, and the document decoder decomposes the document into one or more document fragments in the document.

According to some aspects, the recommendation apparatus described with reference to FIGS. 1 and 2 displays the one or more document fragments in a graphical user interface (GUI) (for example, the document generation user interface described with reference to FIGS. 5, 14, and 17) via a user device (such as the user device described with reference to FIG. 1). A user may select the document fragment from the one or more document fragments displayed in the GUI, and the style extractor identifies the document fragment including the first style element in response to the user selection.

In some embodiments, the document received by the document decoder is structured according to a document object model (DOM) hierarchy. A DOM hierarchy is a programming interface for a document that represents the document in a manner that allows computing devices and programs to identify and manipulate style, structure, and content of the document. In some embodiments, the DOM hierarchy comprises an HTML DOM tree. As used herein, an HTML DOM tree is a DOM hierarchy that is implemented in HyperText Markup Language (HTML), and the HTML DOM tree is a DOM programming interface for a web document.

According to some aspects, the document decoder identifies a set of DOM elements of the DOM hierarchy, where the document fragment corresponds to one of the plurality of DOM elements. As used herein, a "DOM element" is a portion of a DOM hierarchy that labels style, structure, or content elements of a document. In some embodiments, the DOM element is an HTML element. The document fragment corresponds to the DOM element based on labels included in the DOM hierarchy, where the labels identify a portion of the document as a document fragment.

In some embodiments, a document fragment includes one or more style elements. As used herein, a "style element" is data that corresponds to a visual characteristic of content elements included in the document.

According to some aspects, the document decoder separates the document into one or more document fragments based on the set of DOM elements, and stores the document fragment in a database, such as the database described with reference to FIG. 1. For example, the document decoder analyzes the DOM hierarchy of the document and separates the document into document fragments using a DOM parser, such as Beautiful Soup (a Python library for extracting data from a DOM hierarchy).

According to some aspects, the style extractor extracts the first style element from the document fragment based on a style tag. For example, in some embodiments, the style extractor receives the document fragment from the document decoder, or retrieves the document fragment from a database, and extracts labeled data from the document fragment. The labeled data includes the first style element and a style tag (a predefined DOM label or HTML identifier) that labels the first style element according to the DOM hierarchy. The style extractor extracts the first style element from the document fragment according to the style tag. In some embodiments, the style extractor stores the first style element in a database, such as the database described with reference to FIG. 1. In some embodiments, the document fragment and the first style element are associated with each other in the database according to a data schema.

According to some aspects, prior to sending the document fragment to a database or to the style extractor, the document decoder identifies code in the document fragment that is not associated with a style tag and uses heuristics such as a style element size, content of the document, and a value of document attributes (e.g., whether text in the document corresponds to a hyperlink, a source file, etc.) to accordingly apply style tags to unlabeled style elements in the document fragment. For example, two style elements may both be encoded as a <span> element in a document that includes raw HTML code. However, the first style element may include a hyperlink, a relatively small size, and a relatively small amount of content, and so the document decoder may the first style element as a button style element instead of, for example, a text paragraph style element.

According to some aspects, the style extractor identifies a set of style categories including the first style category and the second style category. As used herein, a style category is a type of style elements, and the style encoder identifies the set of style categories by analyzing style tags included in document fragments. According to some aspects, the document decoder receives a set of documents from a user or retrieves the set of documents from a database, such as the database described with reference to FIG. 1, and decomposes the set of documents to obtain a set of document fragments that the document decoder stores in a database, such as the database described with reference to FIG. 1. The style extractor retrieves the set of document fragments from the database and identifies the set of style categories by analyzing style tags included in the set of document fragments.

In some embodiments, the set of style categories includes a layout style category, a color scheme style category, a button style category, a text style category, an image style category, or any combination thereof. The layout style category identifies a high-level structure of a document fragment, including a number of columns, content elements included in each column, and relative sizes and positions of the content elements. The color scheme style category identifies a general color style of a document fragment, such as a color of a DOM container in the document fragment. In some embodiments, a document fragment includes multiple sections (e.g., columns and/or rows) having different color schemes from each other, and therefore a corresponding color scheme style category includes multiple color style elements that correspond to multiple color schemes. In some embodiments, the button style category and the text style category include button style elements and text style elements, such as CSS style elements or inline style elements that are related to button style elements and text style elements, while a size of a button content element and a text content element, a text color of the button element, and a text style of the button element or the text content element are identified by the layout style category and the color scheme style category, respectively. Examples of style categories and style elements are described with reference to FIG. 7.

According to some aspects, the style extractor stores data corresponding to the set of style categories in a database, such as the database described with reference to FIG. 1, and categorizes extracted style elements stored in the database according to their respective style categories. In some embodiments, the style extractor stores the data corresponding to the set of style categories and the style elements in the database as CSS configurations so that the style elements can be applied to document content elements.

At operation 610, the system computes a reward function based on a correlation value between the first style element and a second style element of a second style category different from the first style category, where the correlation value is based on correlations between style elements in a plurality of historical document fragments. In some cases, the operations of this step refer to, or may be performed by, a style generator as described with reference to FIGS. 2 and 3. According to some aspects, the style generator computes the correlation value as described with reference to FIG. 8 and computes the reward function as described with reference to FIG. 9.

At operation 615, the system selects the second style element based on the reward function. In some cases, the operations of this step refer to, or may be performed by, a style generator as described with reference to FIGS. 2 and 3. According to some aspects, the style generator selects the second style element based on the reward function as described with reference to FIG. 9.

At operation 620, the system generates a modified document fragment that includes the first style element of the first style category and the second style element of the second style category. In some cases, the operations of this step refer to, or may be performed by, a document generator as described with reference to FIGS. 2 and 3. According to some aspects, the document generator generates the modified document by transferring content included in content elements of the user-selected document fragment to matching content elements in the modified document fragment and applying the first style element and the second style element to one or more of the matching content elements, such that the one or more of the matching content elements includes visual characteristics described by the first style element and the second style element. According to some aspects, the modified document fragment includes a set of style elements selected based on the Monte Carlo tree search described with reference to FIG. 9. According to some aspects, the style generator generates the modified document fragment as further described with reference to FIGS. 11 and 12.

Figure 7:
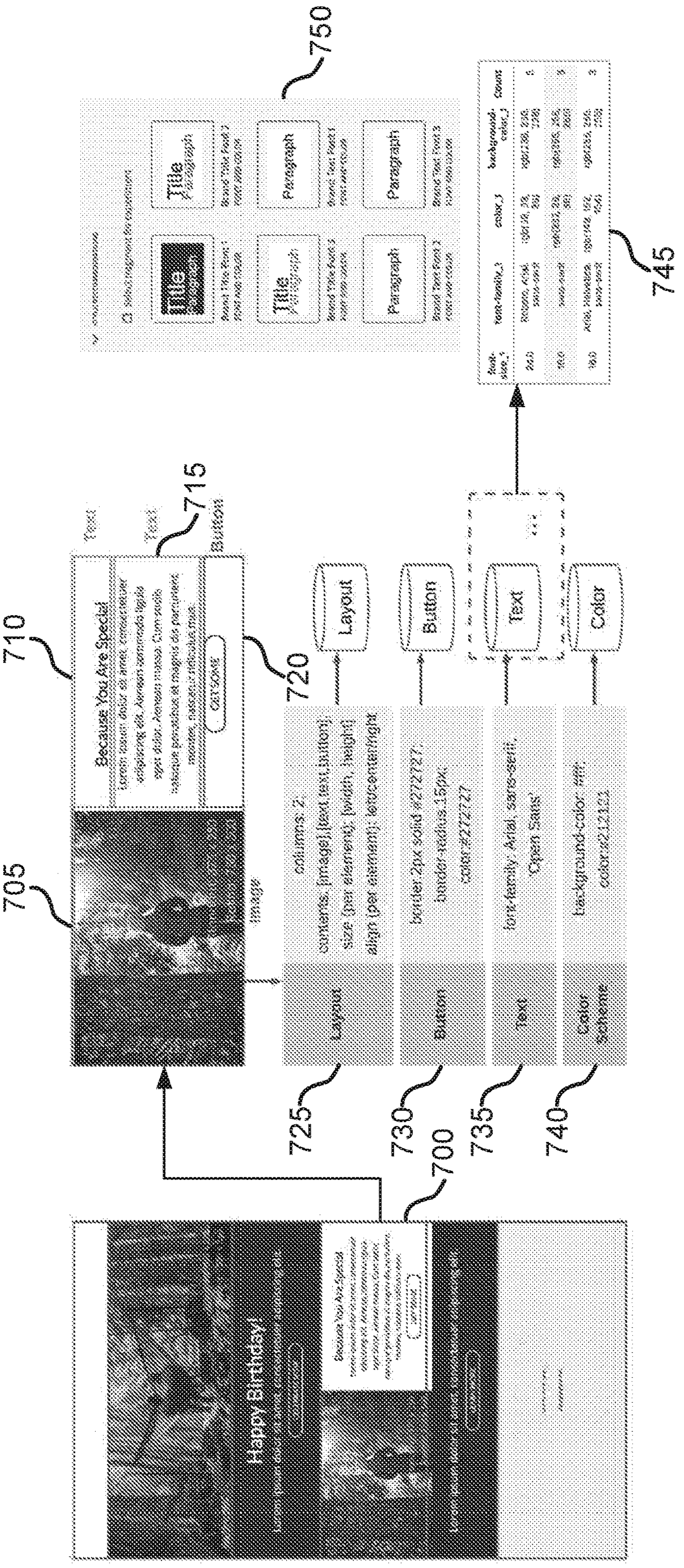
FIG. 7 shows an example of extracting style elements according to aspects of the present disclosure.

FIG. 7 shows an example of extracting style elements according to aspects of the present disclosure. The example shown includes document fragment 700, image content element 705, first text content element 710, second text content element 715, button content element 720, layout style category 725, button style category 730, text style category 735, color scheme style category 740, stored text style elements 745, and style recommendation representations 750.

Referring to FIG. 7, document fragment 700 is included in a document provided to the document generation system by a user. Document fragment includes image content element 705, first text content element 710, second text content element 715, and button content element 720. Document fragment 700 is an example of, or includes aspects of, the corresponding element described with reference to FIGS. 5 and 16.

In some embodiments, a style extractor described with reference to FIGS. 2 and 3 identifies document fragment 700 and extracts respective style elements corresponding to first text content element 710, second text content element 715, and button content element 720 from document fragment 700. FIG. 7 shows examples of style elements respectively included in layout style category 725, button style category 730, text style category 735, and color scheme style category 740. For example, layout style category 725 includes style elements extracted from document fragment 700 that describe visual characteristics of the layout of document fragment 700, such as "columns: 2", "contents: [image], [text,text,button]", "size (per element): [width, height]", and "align (per element): left/center/right", and text style category 735 includes text style elements extracted from document fragment 700 that describe visual characteristics of first text content element 710 and second text content element 715, such as "font-family: Arial, sans-serif", and "'Open Sans'".

Stored text style elements 745 is an example of a set of style elements that are extracted from a set of document fragments and includes the style elements extracted from document fragment 700. In some embodiments, stored text style elements 745 is stored in a database, such as the database described with reference to FIG. 1. Style recommendation representations 750 are examples of thumbnail visual representations of style elements that may be applied to default content elements. In some embodiments, style recommendation representations 750 are displayed to a user in a graphical visual interface (GUI) (such as the document generation user interface described with reference to FIG. 5) to provide a visualization of second style elements that can be selected to be applied to content included in document fragment 700 to generate a modified document fragment.

Figure 8:
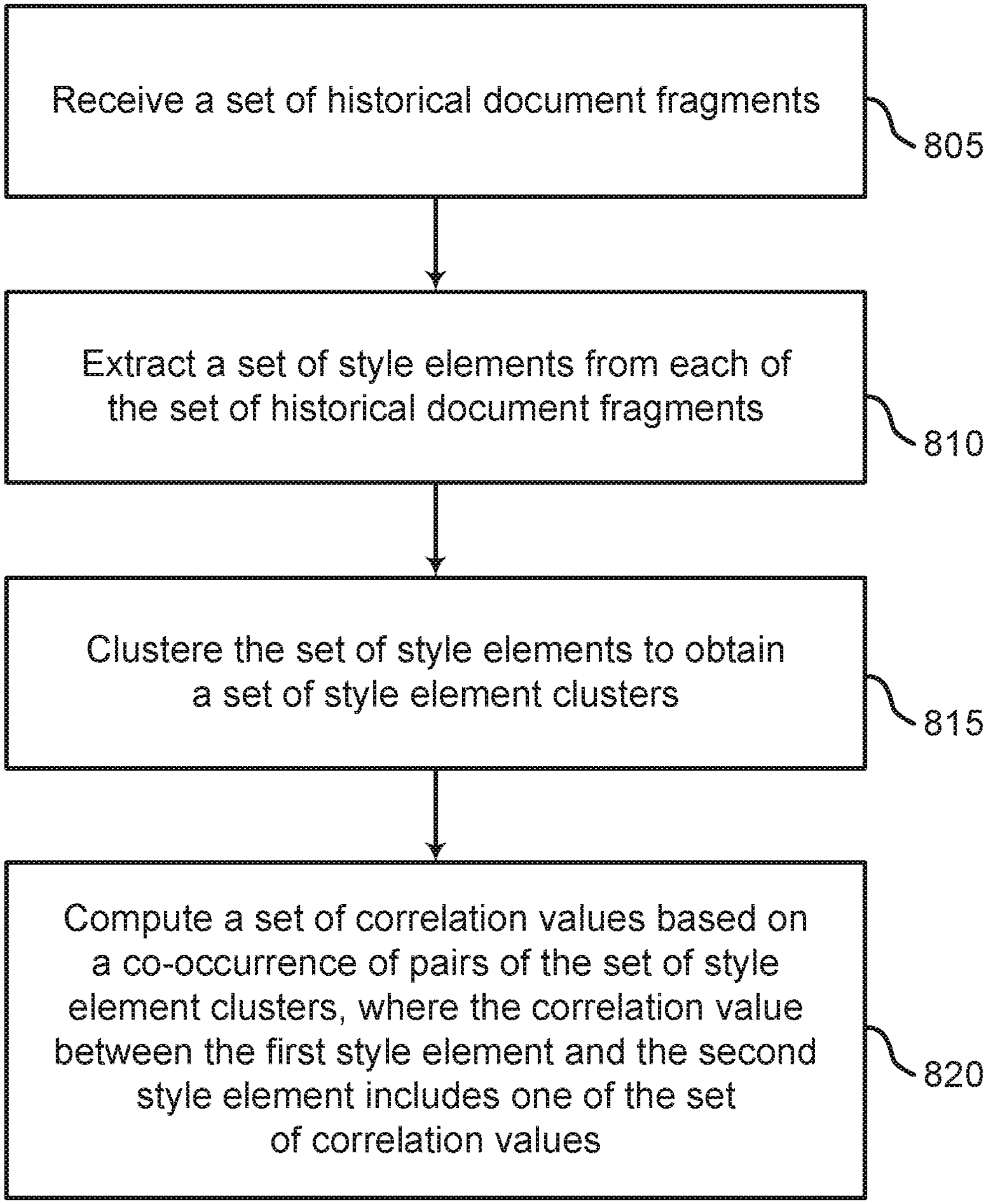
FIG. 8 shows an example of computing correlation values according to aspects of the present disclosure.

FIG. 8 shows an example of computing correlation values according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a set of historical document fragments. In some cases, the operations of this step refer to, or may be performed by, a style extractor as described with reference to FIGS. 2 and 3. For example, the document decoder receives or retrieves a set of documents as described with reference to FIG. 6 and decomposes the set of documents into a set of document fragments based on DOM elements in the set of documents as described with reference to FIG. 6. In some embodiments, the document decoder stores the set of document fragments in a database (such as the database described with reference to FIG. 1) as a set of historical document fragments. In some embodiments, the style extractor receives the set of historical document fragments by retrieving the set of historical document fragments from the database. In some embodiments, the style extractor retrieves the set of historical document fragments in response to extracting the first style element from a document fragment as described with reference to FIG. 6.

At operation 810, the system extracts a set of style elements from each of the set of historical document fragments. In some cases, the operations of this step refer to, or may be performed by, a style extractor as described with reference to FIGS. 2 and 3. In some embodiments, the style extractor extracts the set of style elements from each of the set of historical document fragments based on style tags included in the set of historical document fragments and stores the set of style elements in a database as described with reference to FIG. 6. In some embodiments, the set of historical document fragments includes the second style element described with reference to FIG. 6.

At operation 815, the system clusters the set of style elements to obtain a set of style element clusters. In some cases, the operations of this step refer to, or may be performed by, a style generator as described with reference to FIGS. 2 and 3. According to some aspects, the style generator identifies the set of style categories including the first style category and the second style category. In an example, the style generator retrieves the set of style elements from the database and clusters the style elements according to style categories based on associations between the set of style elements and style categories in the data schema of the database. In some embodiments, each style element cluster includes style elements of the set of style elements that are similar to each other, as determined based on similarities between characteristics of the style elements.

At operation 820, the system computes a set of correlation values based on a co-occurrence of pairs of the set of style element clusters, where the correlation value between the first style element and the second style element includes one of the set of correlation values. In some cases, the operations of this step refer to, or may be performed by, a style generator as described with reference to FIGS. 2 and 3. In some embodiments, a correlation value is a co-occurrence probability that a given style element cluster of the set of style element clusters is included in a historical document fragment with another given style element cluster, and the style generator computes the set of correlation values by computing co-occurrence probabilities for each possible pair of style element clusters of a set of style elements included in the document fragment and the set of historical document fragments. In some embodiments, a correlation value represents a normalized number of times that style elements in the pair of style element clusters are included in a same document fragment.

Figure 9:
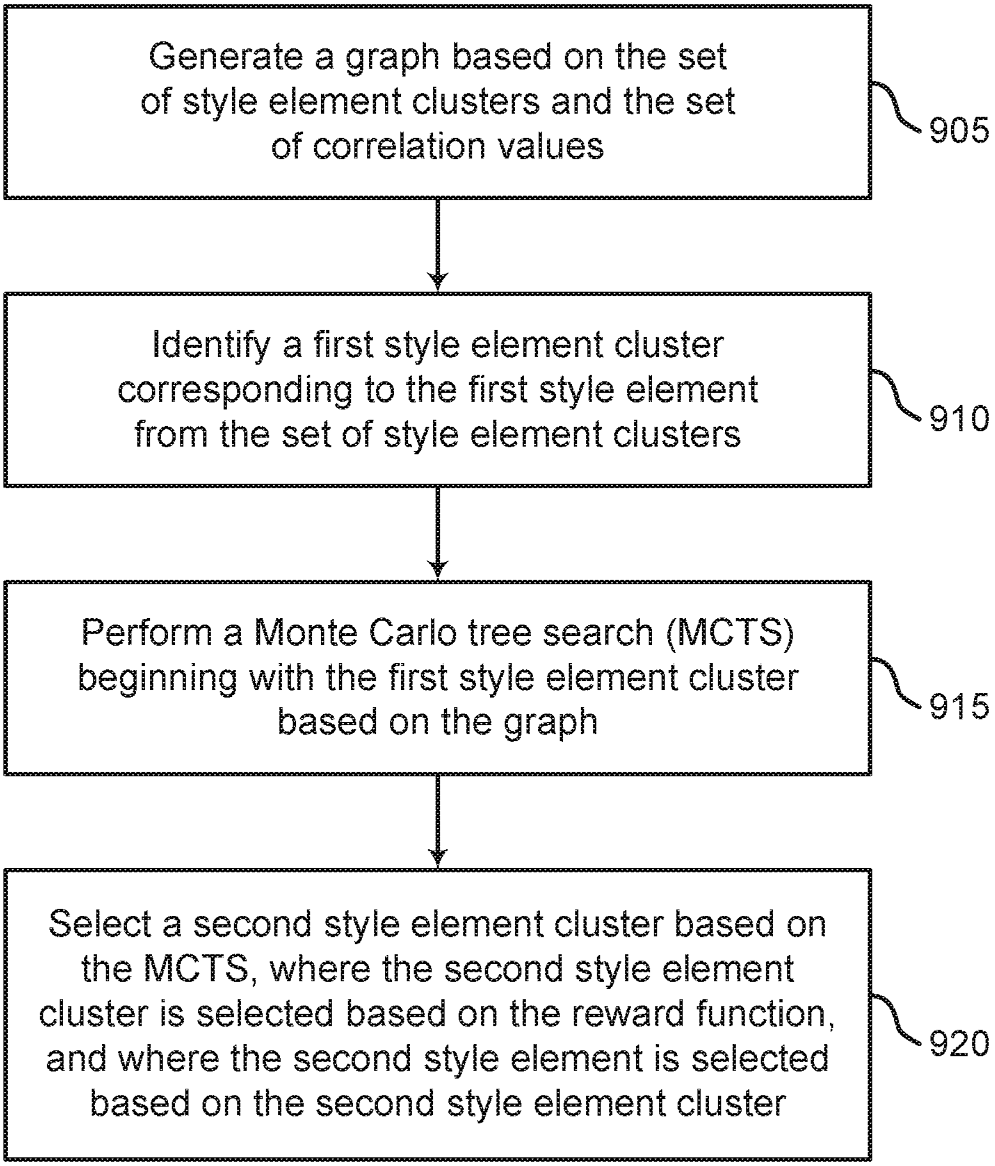
FIG. 9 shows an example of selecting a second style element according to aspects of the present disclosure.

FIG. 9 shows an example of selecting a second style element according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system generates a graph based on the set of style element clusters and the set of correlation values. In some cases, the operations of this step refer to, or may be performed by, a style generator as described with reference to FIGS. 2 and 3. For example, after clustering the set of style elements and computing the set of correlation values as described with reference to FIG. 8, the style generator generates a correlation graph for the style elements, where each cluster of style elements c is represented as a node in the graph and correlation values p between a pair of style element clusters is represented as a link between the pair of style element clusters. Accordingly, a document fragment or a recommend fragment can be represented as a sequence $D=\{c_1, p_1, \ldots, c_{n-1}, p_{n-1}, c_n\}$. An example of the graph is described with reference to FIG. 10.

At operation 910, the system identifies a first style element cluster corresponding to the first style element from the set of style element clusters. In some cases, the operations of this step refer to, or may be performed by, a style generator as described with reference to FIGS. 2 and 3. For example, the style generator analyzes the graph to determine the style element cluster that includes the first style element.

At operation 915, the system performs a Monte Carlo tree search (MCTS) beginning with the first style element cluster based on the graph. In some cases, the operations of this step refer to, or may be performed by, a style generator as described with reference to FIGS. 2 and 3. A Monte Carlo tree search is a heuristic search algorithm that expands a search tree corresponding to a search space (in this case, the graph) based on random sampling of the search space. The search tree is expanded based on probabilities of associations of nodes (in this case, style element clusters) until the search tree includes information corresponding to the desired number of node categories (in this case, style categories that include the style element clusters). In some embodiments, the style generator dynamically generates a Monte Carlo search tree corresponding to the graph and searches through the Monte Carlo search tree to find a combination of style elements with a greatest probability of co-occurrence in a document fragment of the set of historical document fragments.

In some embodiments, the style generator gradually generates the Monte Carlo search tree with a goal of including in the search tree a style category for each content element included in the user-selected document fragment. In some embodiments, the search process begins with the first style element cluster. In some embodiments, the search process begins with a random initialization of values corresponding to a layout style element cluster. In some embodiments, the style generator performs filters the layout style element clusters included in the graph prior to the random initialization based on content elements included in the user-selected document fragment.

In some embodiments, the style generator generates the sequence D for a modified document fragment by iteratively expanding the Monte Carlo search tree with style clusters included in the graph. In some cases, each step of the search tree expansion is restricted within a scope of a specific style category, such that the search tree is expanded in the order of button style element clusters, text style element clusters, and color scheme style element clusters, until a style element cluster corresponding to each content element in the document fragment is included in the sequence D.

According to some aspects, the style generator identifies a target number of candidate paths and selects a plurality of candidate paths through the graph based on the MCTS and the target number of candidate paths. For example, at each step of the expansion of the Monte Carlo search tree, the style generator computes the reward function $\sigma$=avg ($P_{c_i}$, c*, c*∈D) based on average correlation values among all clusters in a target number of candidate paths, and paths with a top-k reward, where k is a number of candidate paths that correspond to the number of style element clusters to be included in the sequence D, are preserved for further expansions.

In some embodiments, the style generator stops expanding the Monte Carlo search tree when the search tree includes style element clusters in the sequence D corresponding to each content element in the user-selected document fragment. In some embodiments, the user-selected document fragment does not include style elements corresponding to one or more of a layout style category, a color scheme style category, a button style category, a text style category, and an image style category. In these cases, the style generator may stop expanding the Monte Carlo search tree when the search tree includes style element clusters corresponding to the one or more of the layout style category, the color scheme style category, the button style category, and the text style category that are omitted from the document fragment.

In some embodiments, the style generator generates a predetermined number of sequences D for the user-document fragment, where a difference in style elements included in the sequences D is achieved based on the random initialization of values corresponding to a layout style element cluster.

In some embodiments, the style generator performs multiple expansion steps for the search tree when the document fragment includes multiple content elements of a same category. For example, if the document fragment includes two text paragraph content elements, the style generator expands the Monte Carlo search tree to include two style element clusters that correspond to the text paragraph content elements (such as two layout style clusters, two color scheme style clusters, and two text style clusters).

At operation 920, the system selects a second style element cluster based on the MCTS, where the second style element cluster is selected based on the reward function, and where the second style element is selected based on the second style element cluster. In some cases, the operations of this step refer to, or may be performed by, a style generator as described with reference to FIGS. 2 and 3. For example, in some embodiments, the style generator selects the second style element cluster based on the MCTS and the reward a. In some embodiments, the second style element is included in the second style element cluster among the selected set of style element clusters. In some embodiments, the style generator selects the second style element of the set of style elements from the second style cluster. In some embodiments, the second style element is randomly selected from the second style cluster. Examples of the Monte Carlo search tree and rewards calculated according to the reward function are described with reference to FIG. 10.

In some embodiments, the style generator generates a corresponding content element for each style element included in a sequence D, and associates the corresponding content element with the style element. For example, if a sequence D includes a layout style element, the style generator generates a layout content element and associates the layout content element with the sequence D according to a data schema.

Figure 10:
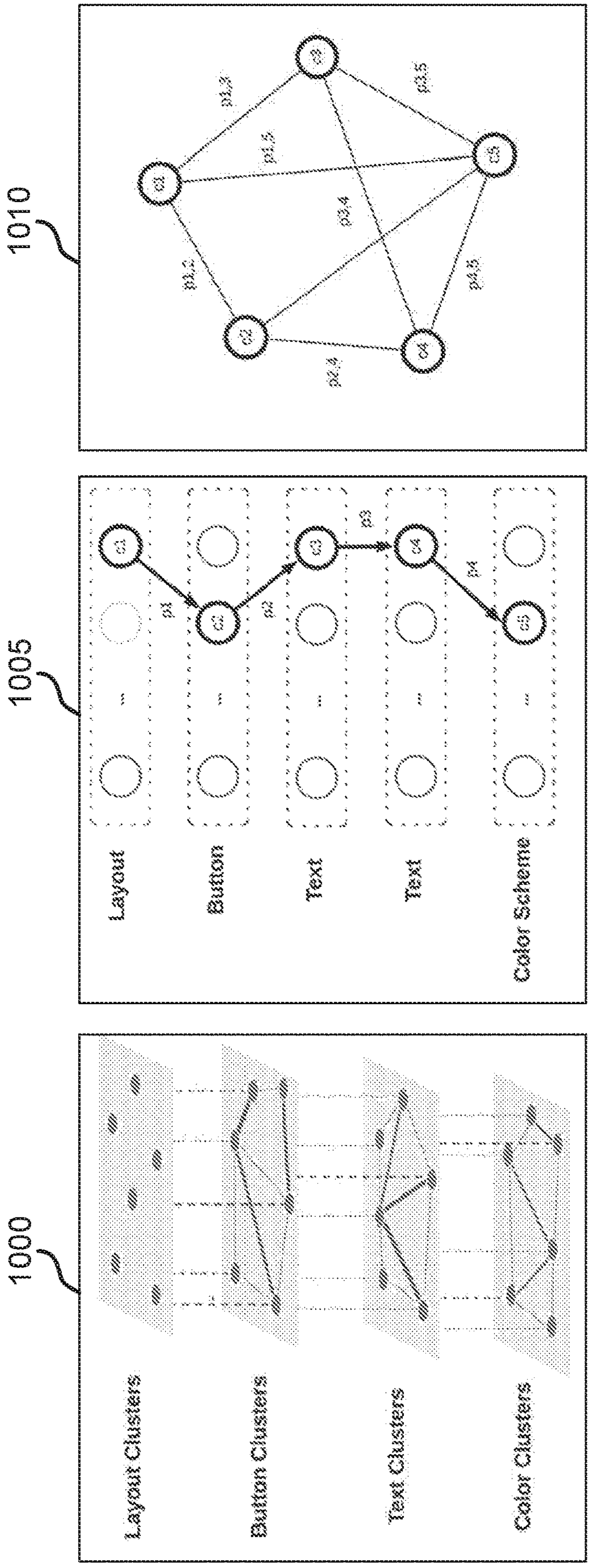
FIG. 10 shows an example of Monte Carlo tree searching according to aspects of the present disclosure.

FIG. 10 shows an example of Monte Carlo tree searching according to aspects of the present disclosure. The example shown includes correlation graph 1000, Monte Carlo search tree 1005, and reward function visualization 1010.

Referring to FIG. 10, a style generator described with reference to FIGS. 2 and 3 generates correlation graph 1000 based on clusters of style elements as described with reference to FIG. 9. The style generator then gradually generates Monte Carlo search tree 1005 to search through correlation graph 1000 based on correlation values and a reward function as described with reference to FIG. 9. Reward function visualization 1010 is a visualization of a reward calculation between style element clusters c and fragment co-occurrence probabilities p, where a likelihood that style element clusters corresponding to different style categories occur in a same document fragment in a set of document fragments is determined.

Figure 11:
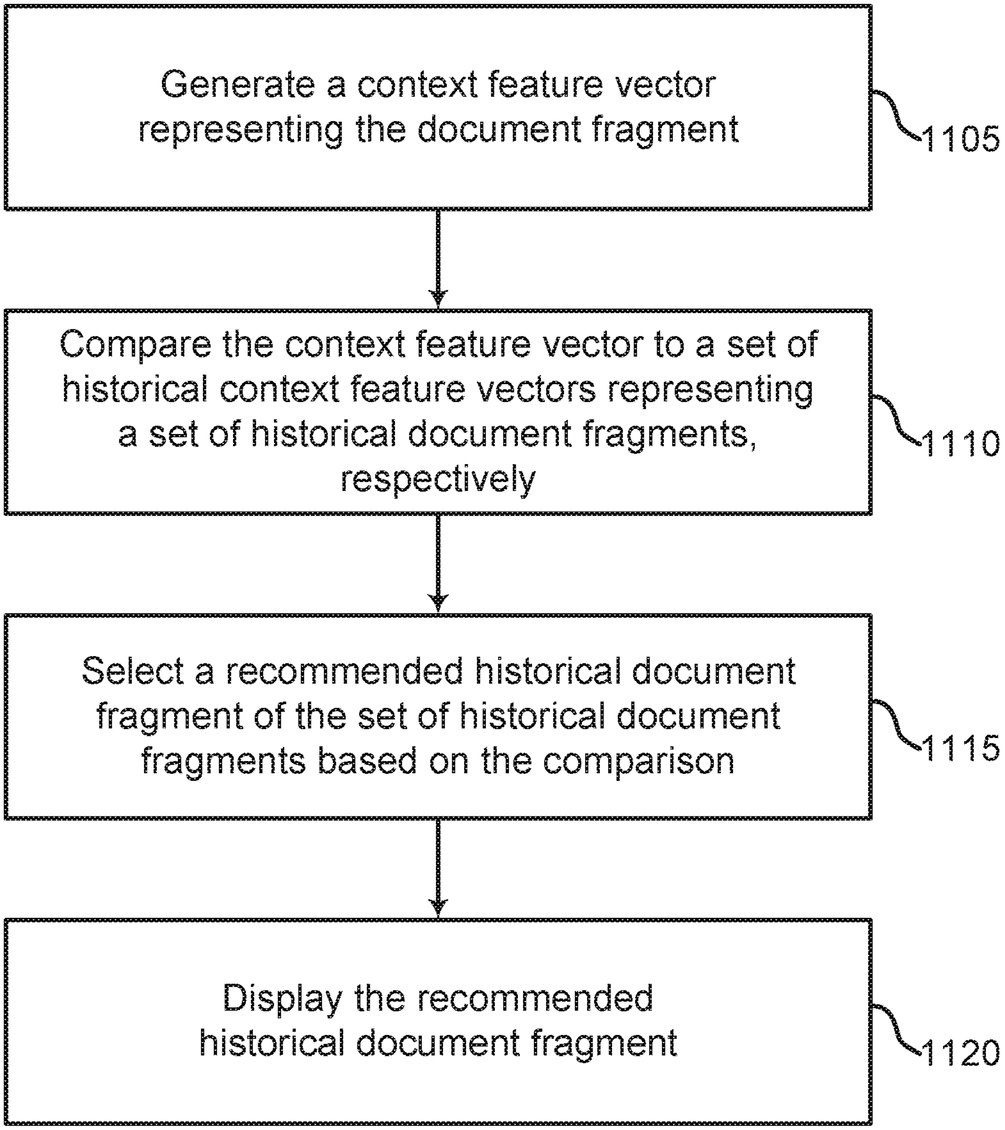
FIG. 11 shows an example of displaying a recommended historical document according to aspects of the present disclosure.

FIG. 11 shows an example of displaying a recommended historical document according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates a context feature vector representing the document fragment. In some cases, the operations of this step refer to, or may be performed by, a style recommender as described with reference to FIG. 3. In some embodiments, the context feature vector is a numerical representation of the style elements and the content elements included in the document fragment. In some cases, the context feature vector describes the context of each content element and style element relative to a location of the user-selected document fragment and the style element size, as determined by the DOM hierarchy of the document fragment.

At operation 1110, the system compares the context feature vector to a set of historical context feature vectors representing a set of historical document fragments, respectively. In some cases, the operations of this step refer to, or may be performed by, a style recommender as described with reference to FIG. 3. In some embodiments, the style recommender receives the set of historical document fragments described with reference to FIG. 8 from the document decoder or retrieves the set of historical document fragments from the database, computes a historical context feature vector for each historical document fragment, where the historical context feature vector is a numerical representation of style elements and content elements included in the historical document fragment, and compares the context feature vector for the user-selected design fragment to each of the historical context feature vectors.

At operation 1115, the system selects a recommended historical document fragment of the set of historical document fragments based on the comparison. In some cases, the operations of this step refer to, or may be performed by, a style recommender as described with reference to FIG. 3. In some embodiments, the style recommender selects the recommended historical document fragment based on an associated historical context feature vector that is most similar to the context feature vector. In some embodiments, to avoid selecting a historical document fragment that is the same as the context feature vector, the style recommender uses a predetermined maximum similarity threshold, such that a historical context feature vector that has a similarity with the context feature vector that is greater than the predetermined maximum similarity threshold is excluded from being selected as the recommended historical document fragment. In some embodiments, the style recommender selects the recommended historical document fragment based on a locality-sensitive hashing algorithm.

At operation 1120, the system displays the recommended historical document fragment. In some cases, the operations of this step refer to, or may be performed by, a style recommender as described with reference to FIG. 3. In some embodiments, the style recommender displays the recommended historical document fragment by providing the recommended historical document generator to a document generator described with reference to FIG. 2. The document generator generates a modified document fragment that includes the content elements of the user-selected design fragment and the style elements included in the recommended historical document fragment, where the style elements are applied to the content elements, and displays the modified document fragment to the user via a graphical user interface (such as the document generation user interface described with reference to FIG. 5). Generation of a modified document fragment is described in further detail with reference to FIG. 12.

Accordingly, the system allows the user to visualize what the content elements of the user-selected document fragment look like when their visual characteristics (such as font, size, color, layout, etc.) are determined by the style elements of the recommended historical document fragment, providing the user with a fast and easy way of obtaining a modified document fragment that includes granular changes from the original user-selected document fragment at a style-element level.

Figure 12:
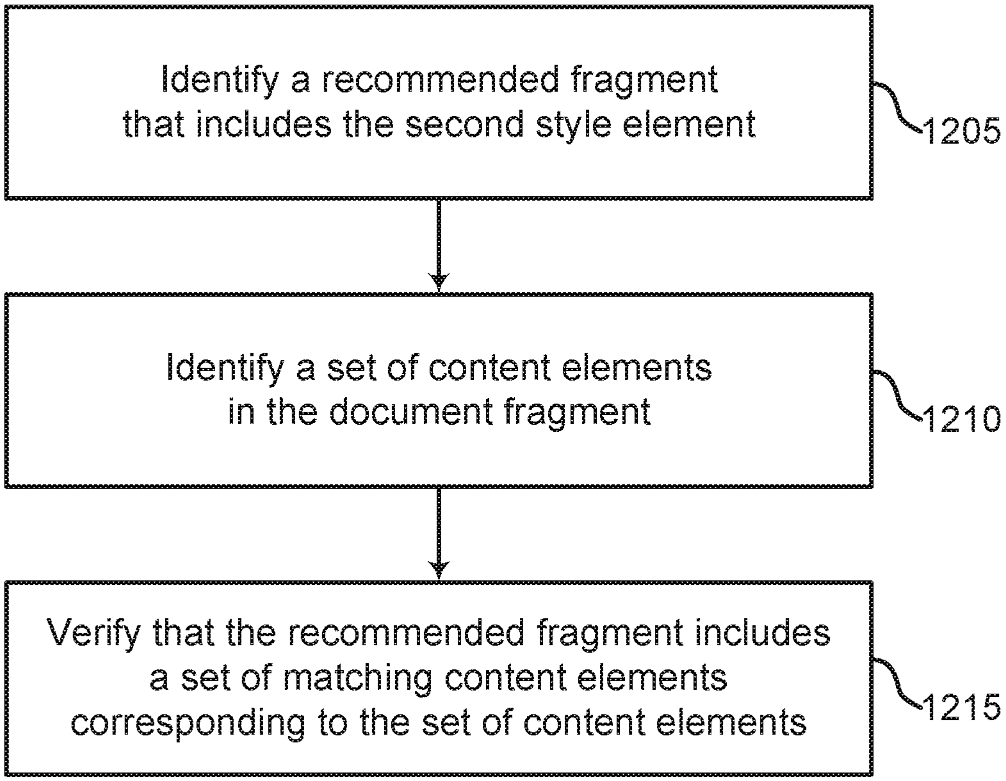
FIG. 12 shows an example of style recommendation according to aspects of the present disclosure.

FIG. 12 shows an example of style recommendation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system identifies a recommended fragment that includes the second style element. In some cases, the operations of this step refer to, or may be performed by, a style recommender as described with reference to FIG. 3. In some embodiments, the style recommender receives the results of the Monte Carlo tree search described with reference to FIG. 9, including one or more sequences D and content elements associated with the one or more sequences D. The style recommender computes a recommended context feature vector for each sequence D and identifies a recommended fragment that includes the style elements and the content elements associated with the recommended context feature vector by comparing the context feature vector described with reference to FIG. 11 with each of the recommended context feature vectors, where the recommended fragment corresponds to the recommended context feature vector that is most similar to the context feature vector. In some embodiments, the style recommender identifies a predetermined number of sequences D that includes the second style element as recommended fragments based on the comparison of the context feature vector with the recommended context feature vectors corresponding to the sequences D.

In some embodiments, the style recommender identifies a historical document fragment described with reference to FIG. 11 as the recommended fragment.

At operation 1210, the system identifies a set of content elements in the document fragment. In some cases, the operations of this step refer to, or may be performed by, a style recommender as described with reference to FIG. 3. In some embodiments, the style recommender identifies the set of content elements in the document fragment based on the context feature vector.

At operation 1215, the system verifies that the recommended fragment includes a set of matching content elements corresponding to the set of content elements. In some cases, the operations of this step refer to, or may be performed by, a style recommender as described with reference to FIG. 3. In some embodiments, the style recommender verifies that the recommended fragment includes a set of matching content elements corresponding to the set of content elements by comparing the recommended context feature vector corresponding to the recommended fragment to the context feature vector corresponding to the document fragment. In some embodiments, the style recommender verifies that the recommended fragment includes a set of matching content elements corresponding to the set of content elements by comparing the recommended historical context feature vector described with reference to FIG. 11 corresponding to the recommended fragment to the context feature vector corresponding to the document fragment.

According to some aspects, the style recommender associates each of the set of content elements with matching content elements of the set matching content elements. For example, in some embodiments, the style recommender performs a bipartite graph matching process, where each of the set of content elements is associated with the matching content element based on the bipartite graph matching process. By using the bipartite graph matching process, the style recommender finds a maximum similarity between content elements included in the document fragment and the matching content elements included in the recommended fragment. An example of a bipartite graph matching process is described with reference to FIG. 13.

According to some aspects, the style recommender transfers content from each of the set of content elements to the matching content element, where the modified document fragment includes the transferred content. For example, the style recommender extracts content from the content elements of the document fragment and inserts the content into the matching content elements of the recommended fragment. The document generator then generates the modified document fragment such that the modified document fragment includes the transferred content and at least the second style element. For example, in a case where the second style element is a text style element, the modified document fragment includes text content that is transferred from a text content element included in the document fragment, and the text content in the modified document fragment includes visual characteristics that are described by the second style element.

According to some aspects, the style recommender identifies an additional content element in the recommended fragment that does not correspond to the set of content elements in the user-selected document fragment. For example, as described with reference to FIG. 9, the recommend fragment may include additional content elements corresponding to style categories that are omitted from the document fragment. Additionally, in a case where the recommended fragment is a historical document fragment, the historical document fragment may include additional content elements that are not included in the document fragment. In some embodiments, the style recommender identifies the additional content element by comparing the context feature vector corresponding to the document fragment with the recommended context feature vector (or the recommended historical context feature vector) during the bipartite graph matching process.

According to some aspects, the style recommender includes default content in the additional content element. In an example, if the additional content element is an image content element, the default content is a predetermined placeholder image, and the style recommender includes the placeholder image in the recommended fragment according to the one or more style elements corresponding to the additional content element. In an example, if the additional content element is a text content element, the default content is predetermined placeholder text, and the style recommender includes the placeholder text in the additional content element according to the one or more style elements corresponding to the additional content element.

Figure 13:
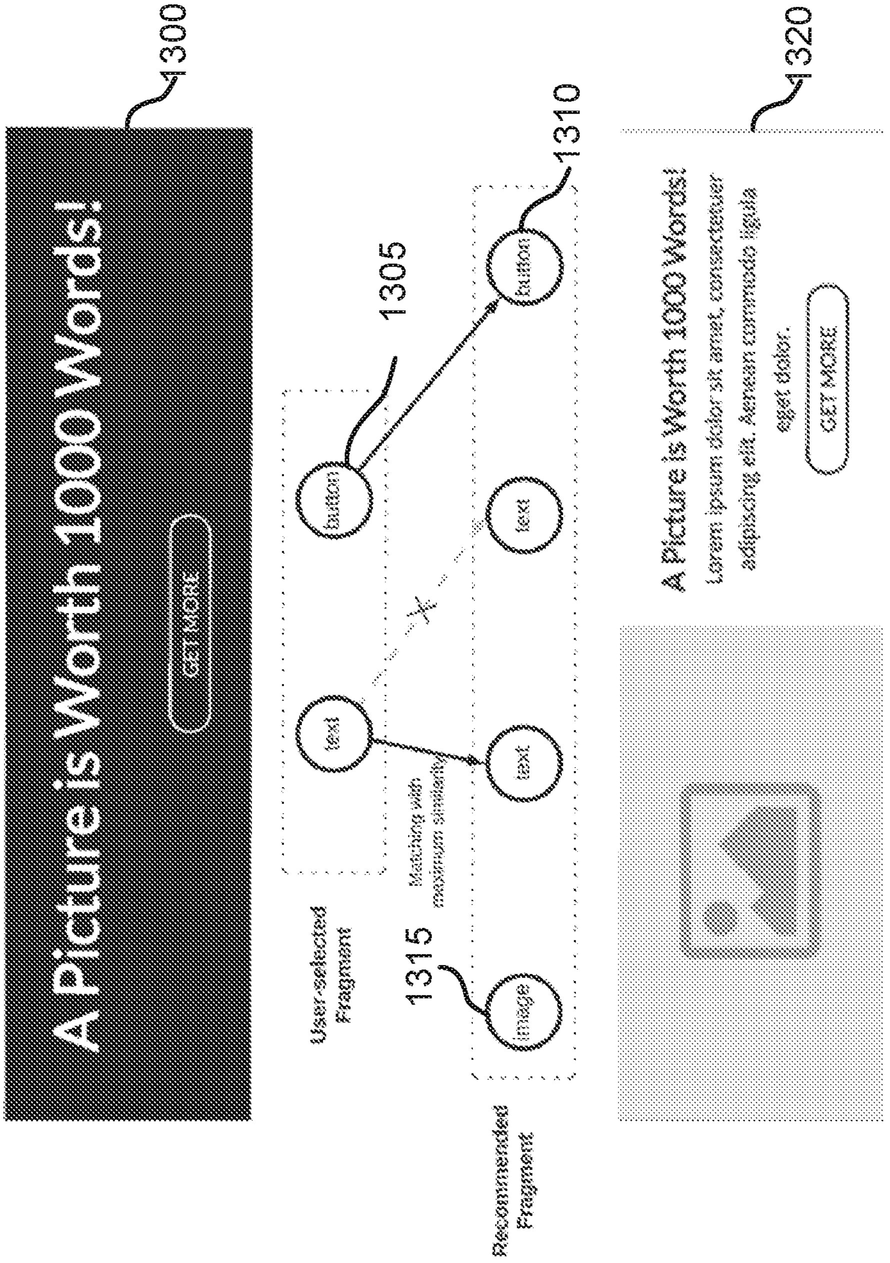
FIG. 13 shows an example of bipartite graph matching according to aspects of the present disclosure.

FIG. 13 shows an example of bipartite graph matching according to aspects of the present disclosure. The example shown includes document fragment 1300, content element 1305, matching content element 1310, default content element 1315, and recommended fragment 1320. Document fragment 1300 is an example of, or includes aspects of, the corresponding element described with reference to FIG. 14. Content element 1305 is an example of, or includes aspects of, the corresponding element described with reference to FIG. 17.

Referring to FIG. 13, a style recommender as described with reference to FIGS. 2 and 3 performs a bipartite graph matching process to verify that recommended fragment 1320 includes a matching content element 1310 that corresponds to content element 1305 included in document fragment 1300, as described with reference to FIG. 12. As shown in FIG. 13, the style recommender transfers content from content element 1305 (including text "GET MORE") to matching content element 1310, such that recommended fragment 1320 includes the content and a second style element, and the content is visualized according to visual characteristics provided by the second style element. Furthermore, the style recommender includes additional content element 1315 (in this case, an image content element) in recommended fragment 1320 as described with reference to FIG. 12.

Figure 14:
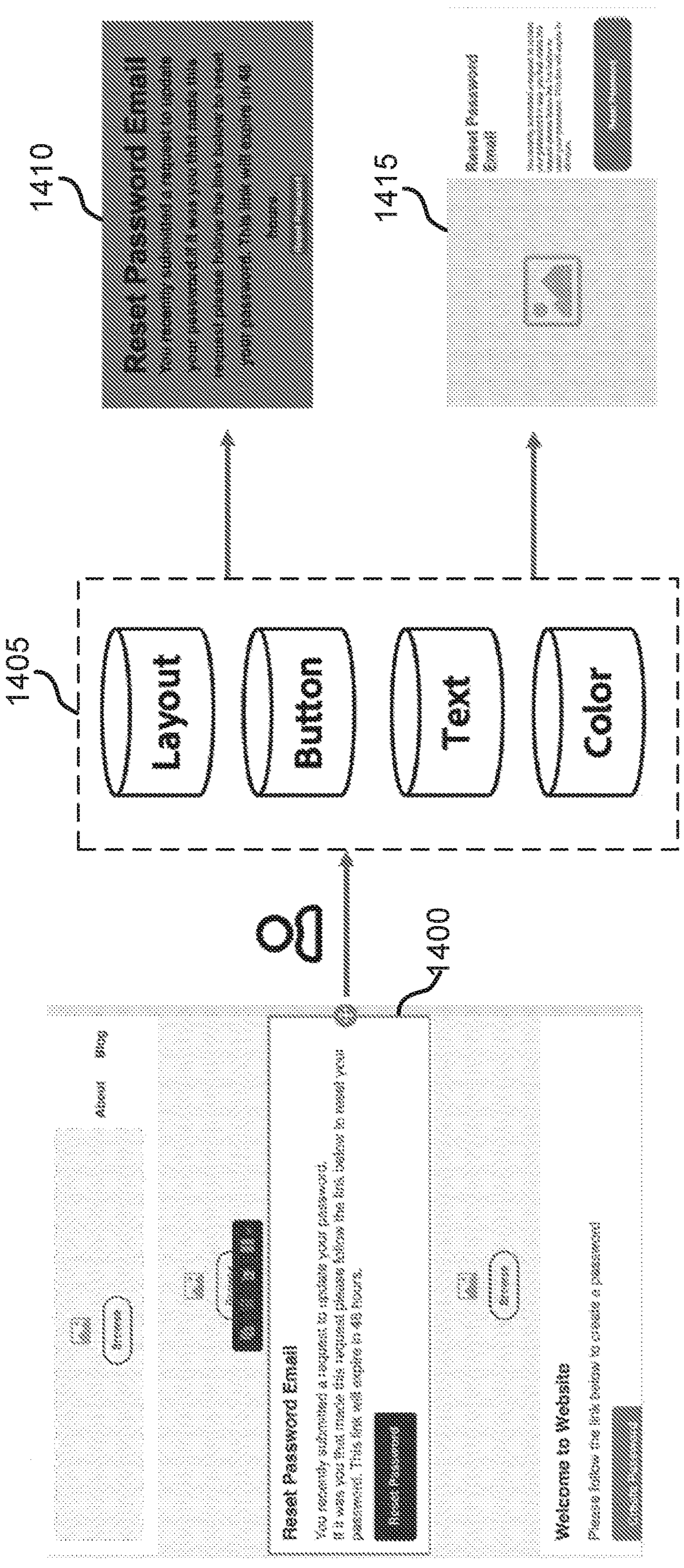
FIG. 14 shows an example of generating document fragments according to aspects of the present disclosure.

FIG. 14 shows an example of generating document fragments according to aspects of the present disclosure. The example shown includes document fragment 1400, style categories 1405, first modified document fragment 1410, and second modified document fragment 1415. Document fragment 1400 is an example of, or includes aspects of, the corresponding element described with reference to FIG. 13. Style categories 1405 is an example of, or includes aspects of, the corresponding element described with reference to FIG. 3.

Referring to FIG. 14, a user selects document fragment 1400 in a document generation user interface (such as the document generation user interface described with reference to FIGS. 5 and 16), and a style extractor described with reference to FIGS. 2 and 3 extracts style elements from the document fragment in response to the selection as described with reference to FIG. 6. A document generator described with reference to FIGS. 2 and 3 generates first modified document fragment 1410 and second modified document fragment 1415 based on style elements included in a set of style elements as described with reference to FIG. 12. In some embodiments, the user selects style elements to preserve and modify in the document fragment as described with reference to FIGS. 15-17. In these cases, first modified document fragment 1410 and second modified document fragment 1415 can be examples of a degree of variation in style elements included in a modified document fragment based on user selection.

Document Generation Based on Style Element Preservation

A method for document generation is described with reference to FIGS. 15-17. One or more aspects of the method include identifying a document fragment including a first style element to be preserved and a second style element to be modified, wherein the first style element corresponds to a first style category and the second style element corresponds to a second style category different from the first style category; selecting a modified second style element of the second style category based on a reward function that is computed based on a correlation value between the first style element and the modified second style element; and generating a modified document fragment that includes the first style element corresponding to the first style category and the modified second style element of the second style category.

Some examples of the method further include identifying a plurality of candidate document fragments including the modified document fragment. Some examples further include receiving a user selection identifying the modified document fragment. Some examples further include replacing the document fragment with the modified document fragment based on the user selection.

Figure 15:
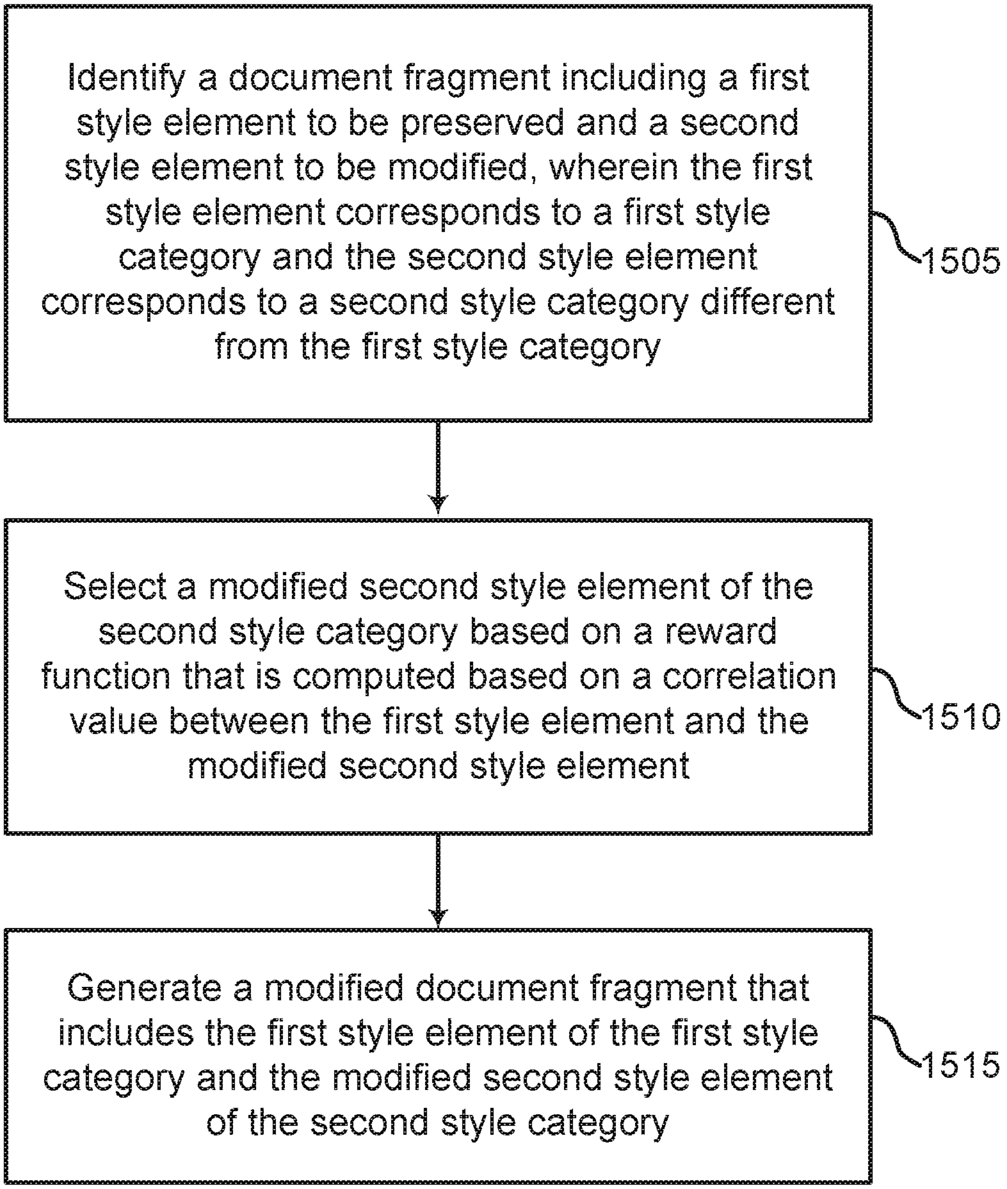
FIG. 15 shows an example of generating a modified document fragment based on style element preservation according to aspects of the present disclosure.

FIG. 15 shows an example of generating a modified document fragment based on style element preservation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 15, the system generates a modified document fragment based on a user selection of a style element of an original document fragment to be preserved and a style element of the original document fragment to be modified. The system thereby provides the user with a quick and easy method of obtaining a user-customized modified document fragment.

At operation 1505, the system identifies a document fragment including a first style element to be preserved and a second style element to be modified, where the first style element corresponds to a first style category and the second style element corresponds to a second style category different from the first style category. In some cases, the operations of this step refer to, or may be performed by, a style extractor as described with reference to FIGS. 2 and 3.

In some embodiments, the style extractor identifies the document fragment as described with reference to FIG. 6. For example, in some embodiments, a user may select the document fragment from one or more document fragments displayed in a graphical user interface (such as the document generation user interface described with reference to FIGS. 5, 14, and 17), and the style extractor identifies the document fragment including the first style element to be preserved and a second style element to be modified in response to the user selection. In an example, the GUI allows the user to select a style element to be modified, and the style extractor identifies the selected style element as the second style element to be modified and an unselected style element as the first style element to be preserved. In an example, the GUI allows the user to select a style element to be preserved, and the style extractor identifies the selected style element as the first style element to be preserved and an unselected style element as the second style element to be modified. An example in which the selected style element is the second style element to be modified is described with reference to FIG. 17.

At operation 1510, the system selects a modified second style element of the second style category based on a reward function that is computed based on a correlation value between the first style element and the modified second style element. In some cases, the operations of this step refer to, or may be performed by, a style generator as described with reference to FIGS. 2 and 3. In some embodiments, the style generator computes a correlation value between the first style element to be preserved and the second style element to be modified as described with reference to FIG. 8 and computes a reward according to a reward function based on the correlation value as described with reference to FIG. 9. In some embodiments, the style generator selects the modified second style element based on the reward by selecting a second style element to be modified from among the set of style elements corresponding to a highest reward.

At operation 1515, the system generates a modified document fragment that includes the first style element corresponding to the first style category and the modified second style element of the second style category. In some cases, the operations of this step refer to, or may be performed by, a document generator as described with reference to FIGS. 2 and 3. In some embodiments, a style recommender receives the selection of the modified second style element from the style generator and identifies a recommended fragment that includes the first style element and the modified second style element as described with reference to FIG. 12. In some embodiments, the document generator receives the identification of the recommended fragment and generates the modified document fragment based on the identification. Accordingly, the system provides the user with a modified document that includes a user selected style element and a user requested modified style element, thereby providing the user with the ability to quickly and easily manipulate visual characteristics of an original document fragment at a content element level of granularity.

Figure 16:
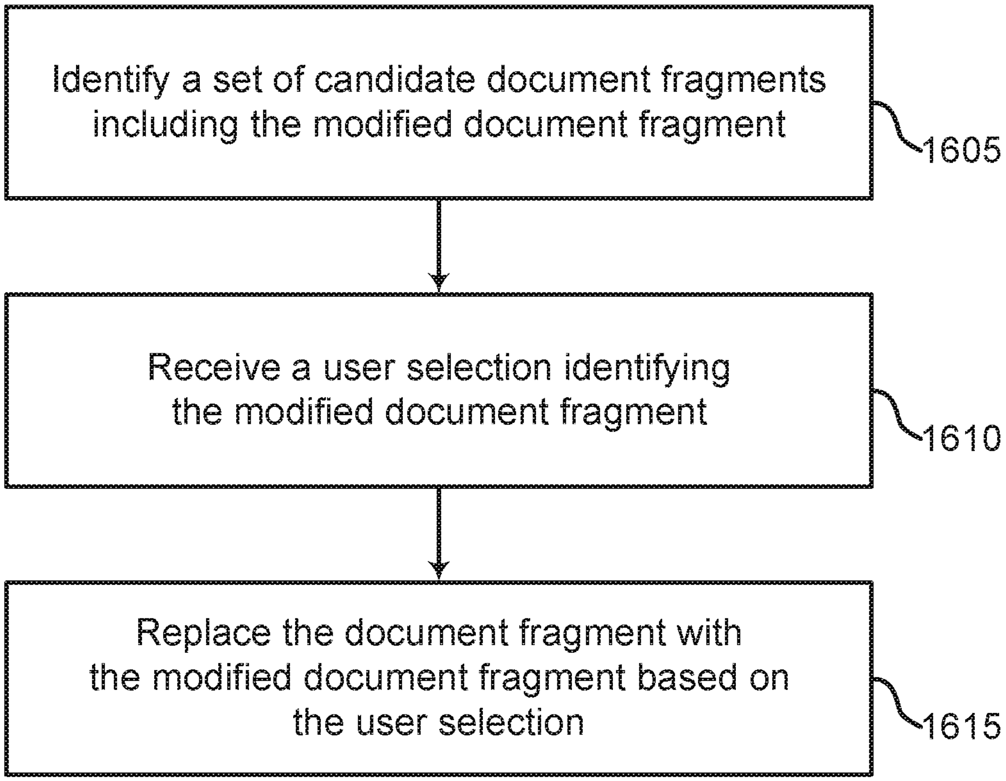
FIG. 16 shows an example of replacing a document fragment according to aspects of the present disclosure.

FIG. 16 shows an example of replacing a document fragment according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system identifies a set of candidate document fragments including the modified document fragment. In some cases, the operations of this step refer to, or may be performed by, a document generator as described with reference to FIGS. 2 and 3. In some embodiments, the style recommender selects a set of modified second style elements in a similar manner to the process of selecting a modified second style element described with reference to FIG. 15, and the document generator generates the set of candidate document fragments based on the set of modified second style elements.

At operation 1610, the system receives a user selection identifying the modified document fragment. In some cases, the operations of this step refer to, or may be performed by, a document generator as described with reference to FIGS. 2 and 3. In some embodiments, the document generator displays the set of candidate document fragments via a graphical user interface (GUI) (such as the document generation user interface described with reference to FIGS. 5, 14, and 17), or displays a set of visual representations of the set of candidate document fragments, such as thumbnail images, including the modified second style elements. The user selects the modified document fragment, or the visual representation of the modified document fragment, in the GUI, and the document generator receives the selection.

At operation 1615, the system replaces the document fragment with the modified document fragment based on the user selection. In some cases, the operations of this step refer to, or may be performed by, a document generator as described with reference to FIGS. 2 and 3. For example, the document generator removes the document fragment from the document and inserts the modified document fragment in the document in response to the user selection of the modified document fragment. The system thereby provides the user with a modified document. In some embodiments, the document generator provides the user with an option to save a local copy of the modified document to a user device, where the file category of the local copy is user-selectable. In some embodiments, the document generator saves the modified document to cloud storage (such as storage included in the cloud described with reference to FIG. 1) or a database (such as the database described with reference to FIG. 1) associated with a user account associated with the user.

Figure 17:
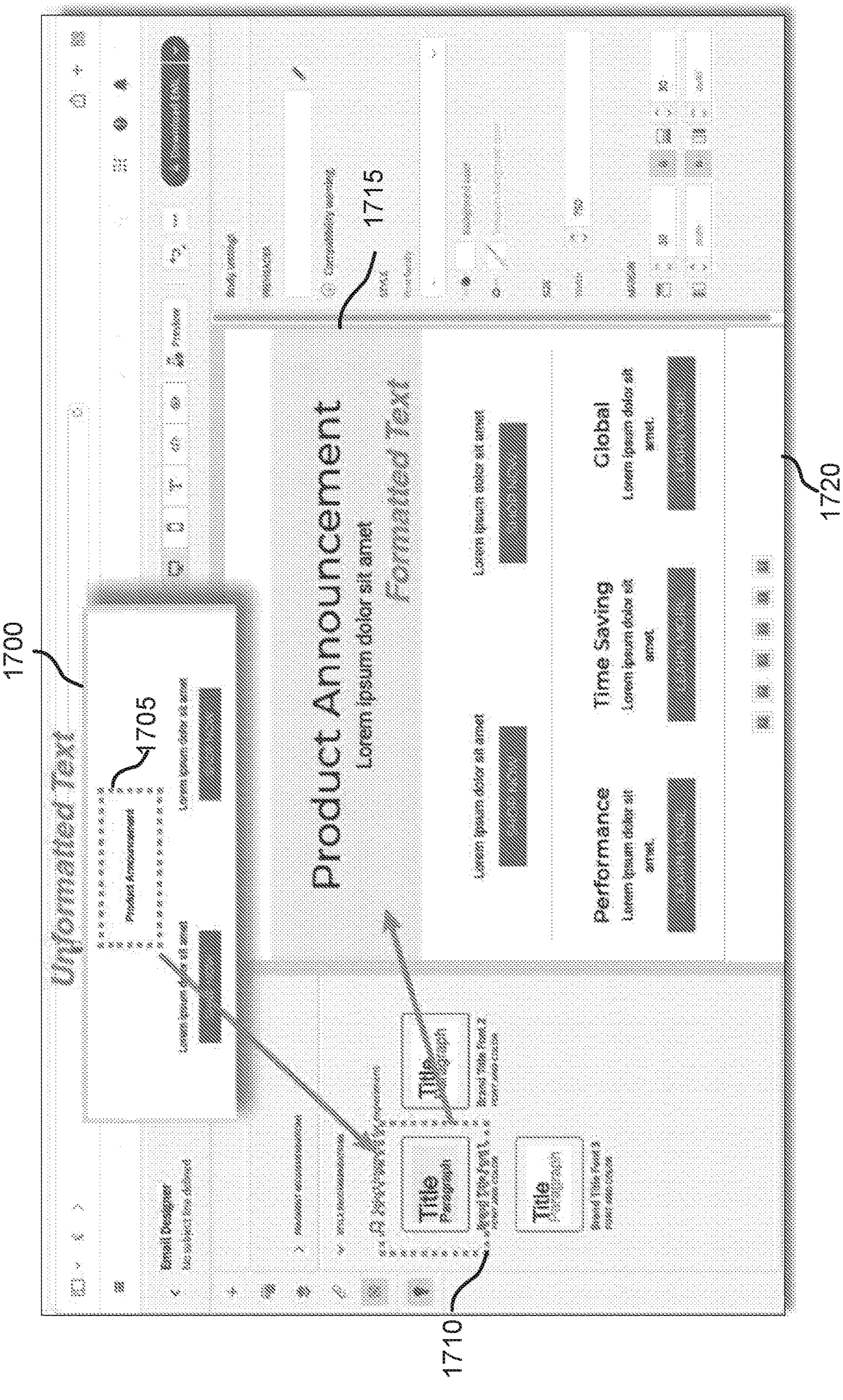
FIG. 17 shows an example of preserving a style element according to aspects of the present disclosure.

FIG. 17 shows an example of preserving a style element according to aspects of the present disclosure. The example shown includes document fragment 1700, content element 1705, candidate document fragment 1710, modified document fragment 1715, and modified document 1720. Document fragment 1700 is an example of, or includes aspects of, the corresponding element described with reference to FIGS. 5 and 7. Content element 1705 is an example of, or includes aspects of, the corresponding element described with reference to FIG. 13.

Referring to FIG. 17, a document generation user interface (such as the document generation user interface described with reference to FIGS. 5 and 14) displays document fragment 1700 in a pop-out window in response to a user input to the document generation user interface. The user selects content element 1705 to indicate that content element 1705 is associated with a style element to be modified. A style extractor described with reference to FIGS. 2 and 3 identifies a first style element in document fragment 1700 to be preserved and identifies the style element associated with content element 1705 as the second style element to be modified as described with reference to FIG. 15. A style recommender described with reference to FIGS. 2 and 3 selects a set of modified second style elements as described with reference to FIGS. 15 and 16. A document generator described with reference to FIGS. 2 and 3 identifies a set of candidate document fragments, including candidate document fragment 1710, based on the set of modified second style elements and displays the set of candidate document fragments to the user. The user selects candidate document fragment 1710 as modified document fragment 1715, and the document generator generates modified document 1720 included modified document fragment 1715.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for document generation, comprising:

identifying, by a style extractor, a document fragment comprising a first style element of a first style category;

computing, by a style generator, a reward function based on a correlation value between the first style category and a second style category different from the first style category, wherein the correlation value is an indication of a visual consistency based on a probability that a style element of the first style category and a style element of the second style category are both included in a historical document fragment;

generating, by the style generator, a graph based on a plurality of style element clusters from a plurality of historical document fragments including the historical document fragment;

performing, by the style generator, a tree search based on the graph;

selecting, by the style generator, a second style element of the second style category based on the reward function and the tree search; and generating, by a document generator, a modified document fragment comprising at least a portion of a media file including the first style element of the first style category and the second style element of the second style category.

2. The method of claim 1, further comprising:

receiving, by a document decoder, a document structured according to a document object model (DOM) hierarchy; and identifying, by the document decoder, a plurality of DOM elements of the DOM hierarchy, wherein the document fragment corresponds to one of the plurality of DOM elements.

3. The method of claim 2, wherein:

the DOM hierarchy comprises an HTML DOM tree.

4. The method of claim 1, further comprising:

extracting, by the style extractor, the first style element from the document fragment based on a style tag.

5. The method of claim 1, further comprising:
identifying, by the style generator, a plurality of style categories including the first style category and the second style category.

6. The method of claim 5, wherein:
the plurality of style categories includes a layout style category, a color scheme category, a button style category, a text style category, an image style category, or any combination thereof.

7. The method of claim 1, further comprising:
receiving, by a document decoder, the plurality of historical document fragments;
extracting, by the style extractor, a plurality of style elements from each of the plurality of historical document fragments;
clustering, by the style generator, the plurality of style elements to obtain a plurality of style element clusters; and
computing, by the style generator, a plurality of correlation values based on a co-occurrence of pairs of the plurality of style element clusters, wherein the correlation value between the first style category and the second style category comprises one of the plurality of correlation values.

8. The method of claim 7, further comprising:
generating, by the style generator, the graph based on the plurality of style element clusters and the plurality of correlation values;
identifying, by the style generator, a first style element cluster corresponding to the first style element from the plurality of style element clusters;
performing, by the style generator, a Monte Carlo tree search (MCTS) beginning with the first style element cluster based on the graph; and
selecting, by the style generator, a second style element cluster based on the MCTS, wherein the second style element cluster is selected based on the reward function, and wherein the second style element is selected based on the second style element cluster.

9. The method of claim 8, further comprising:
selecting, by the style generator, a plurality of style elements based on the MCTS, wherein the modified document fragment comprises the plurality of style elements.

10. The method of claim 8, further comprising:
identifying, by the style generator, a target number of candidate paths; and
selecting, by the style generator, a plurality of candidate paths through the graph based on the MCTS and the target number of candidate paths.

11. The method of claim 1, further comprising:
generating, by a style recommender, a context feature vector representing the document fragment;
comparing, by the style recommender, the context feature vector to a plurality of historical context feature vectors representing a plurality of historical document fragments, respectively;
selecting, by the style recommender, a recommended historical document fragment of the plurality of historical document fragments based on the comparison; and
displaying, by the style recommender, the recommended historical document fragment.

12. The method of claim 1, further comprising:
identifying, by a style recommender, a recommended fragment that includes the second style element;

identifying, by the style recommender, a plurality of content elements in the document fragment; and
verifying, by the style recommender, that the recommended fragment comprises a plurality of matching content elements corresponding to the plurality of content elements.

13. The method of claim 12, further comprising:
associating, by the style recommender, each of the plurality of content elements with a matching content element of the plurality of matching content elements; and
transferring, by the style recommender, content from each of the plurality of content elements to the matching content element, wherein the modified document fragment comprises the transferred content.

14. The method of claim 13, further comprising:
performing, by the style recommender, a bipartite graph matching process, wherein each of the plurality of content elements is associated with the matching content element based on the bipartite graph matching process.

15. The method of claim 12, further comprising:
identifying, by the style recommender, an additional content element in the recommended fragment that does not correspond to the plurality of content elements in the document fragment; and
including, by the style recommender, default content in the additional content element.

16. A method for document generation, comprising:
identifying, by a style extractor, a document fragment including a first style element to be preserved and a second style element to be modified, wherein the first style element corresponds to a first style category and the second style element corresponds to a second style category different from the first style category;
generating, by a style generator, a graph based on a plurality of style element clusters from a plurality of historical document fragments including the historical document fragment;
performing, by the style generator, a tree search based on the graph;
selecting, by the style generator, a modified second style element of the second style category based on a reward function and the tree search, wherein the reward function is computed based on a correlation value between the first style category and the second style category, and wherein the correlation value is an indication of a visual consistency based on a probability that a style element of the first style category and a style element of the second style category are both included in a historical document fragment; and
generating, by a document generator, a modified document fragment comprising at least a portion of a media file including the first style element corresponding to the first style category and the modified second style element of the second style category.

17. The method of claim 16, further comprising:
identifying, by the document generator, a plurality of candidate document fragments including the modified document fragment;
receiving, by the document generator, a user selection identifying the modified document fragment; and
replacing, by the document generator, the document fragment with the modified document fragment based on the user selection.

18. An apparatus for document generation, comprising:

a style extractor configured to extract a first style element of a first style category from a document fragment;

a style generator configured to:

compute a reward function based on a correlation value between the first style category and a second style category, generate a graph based on a plurality of style element clusters from a plurality of historical document fragments including the historical document fragment, perform a tree search based on the graph, and select a second style element of the second style category based on the reward function and the tree search, wherein the correlation value is an indication of a visual consistency based on a probability that a style element of the first style category and a style element of the second style category are both included in a historical document fragment; and a style recommender configured to identify a recommended fragment comprising at least a portion of a media file including the first style element of the first style category and the second style element of the second style category.

19. The apparatus of claim 18, further comprising:

a document generator configured to generate a modified document fragment that includes the first style element of the first style category and the second style element of the second style category.

20. The apparatus of claim 18, further comprising:

a document decoder configured to extract the document fragment from a structured document.

* * * * *